United States Patent
Takahara et al.

(10) Patent No.: US 11,589,508 B2
(45) Date of Patent: Feb. 28, 2023

(54) FIELD MAP GENERATING SYSTEM

(71) Applicant: Kubota Corporation, Osaka (JP)

(72) Inventors: Kazuhiro Takahara, Sakai (JP); Ryuzo Fujita, Sakai (JP); Mitsuhiro Seki, Sakai (JP); Mao Kitahara, Sakai (JP)

(73) Assignee: Kubota Corporation, Osaka (JP)

( * ) Notice: Subject to any disclaimer, the term of this patent is extended or adjusted under 35 U.S.C. 154(b) by 433 days.

(21) Appl. No.: 16/619,614

(22) PCT Filed: Jun. 7, 2018

(86) PCT No.: PCT/JP2018/021867
§ 371 (c)(1),
(2) Date: Dec. 5, 2019

(87) PCT Pub. No.: WO2019/003851
PCT Pub. Date: Jan. 3, 2019

(65) Prior Publication Data
US 2020/0154639 A1  May 21, 2020

(30) Foreign Application Priority Data

Jun. 26, 2017 (JP) .............................. JP2017-124605
Jun. 26, 2017 (JP) .............................. JP2017-124607

(51) Int. Cl.
*A01D 41/127* (2006.01)
*A01G 22/00* (2018.01)
(Continued)

(52) U.S. Cl.
CPC .......... *A01D 41/127* (2013.01); *A01B 79/005* (2013.01); *A01G 22/00* (2018.02);
(Continued)

(58) Field of Classification Search
CPC ..... A01D 41/127; A01G 22/00; A01B 79/005
(Continued)

(56) References Cited

U.S. PATENT DOCUMENTS 6,212,862 B1 *  4/2001  Staub ................... A01D 41/127
56/DIG. 15
9,767,521 B2 *  9/2017  Stuber ................... G06Q 50/02
(Continued)

FOREIGN PATENT DOCUMENTS

CN    104769631 A    7/2015
CN    106528553 A    3/2017
(Continued)

*Primary Examiner* — Ricky Go
(74) *Attorney, Agent, or Firm* — The Webb Law Firm

(57) ABSTRACT

A field map generating system includes: a crop data obtaining unit that obtains crop data over time; a position information obtaining unit that obtains position information, indicating a harvesting position of the crop, over time; polygon constructing units that construct a polygon on the basis of a work width and speed of a harvester, for each piece of crop data obtained by the crop data obtaining unit; data assigning units that assign crop data or crop information based on the crop data to the constructed polygons; a position information assigning unit that assigns position information to the constructed polygons; and field map generating units that generate a field polygon map, which is an aggregate of the polygons, by aggregating the polygons.

24 Claims, 15 Drawing Sheets

(51) Int. Cl.
*A01B 79/00* (2006.01)
*G06Q 50/02* (2012.01)
*G07C 5/00* (2006.01)
*G07C 5/08* (2006.01)

(52) U.S. Cl.
CPC ............ *G06Q 50/02* (2013.01); *G07C 5/008* (2013.01); *G07C 5/0841* (2013.01)

(58) Field of Classification Search
USPC .......................................................... 702/5
See application file for complete search history.

(56) References Cited

U.S. PATENT DOCUMENTS

| | | | | |
|---|---|---|---|---|
| 9,972,058 | B2* | 5/2018 | Romier | ............... A01B 79/005 |
| 10,410,149 | B2 | 9/2019 | Seki et al. | |
| 10,509,872 | B2* | 12/2019 | Hu | ...................... G06Q 10/067 |
| 10,791,666 | B2* | 10/2020 | Sauder | ................... G01C 21/36 |
| 2014/0297242 | A1 | 10/2014 | Sauder et al. | |
| 2015/0293068 | A1 | 10/2015 | Acheson et al. | |
| 2015/0317848 | A1 | 11/2015 | Halmann | |
| 2018/0132419 | A1 | 5/2018 | Ueda et al. | |
| 2018/0168100 | A1 | 6/2018 | Ueda et al. | |
| 2018/0177125 | A1 | 6/2018 | Takahara et al. | |

FOREIGN PATENT DOCUMENTS

| | | |
|---|---|---|
| CN | 106679717 A | 5/2017 |
| EP | 0960558 A1 | 12/1999 |
| EP | 0967854 B1 | 7/2003 |
| EP | 2382853 A2 | 11/2011 |
| EP | 2902957 A1 | 8/2015 |
| EP | 2902984 A1 | 8/2015 |
| JP | 201467308 A | 4/2014 |
| JP | 201737681 A | 2/2017 |
| JP | 201746642 A | 3/2017 |
| JP | 201755735 A | 3/2017 |
| JP | 2017102924 A | 6/2017 |
| JP | 2017104036 A | 6/2017 |
| WO | 2015038751 A1 | 3/2015 |
| WO | 2016147521 A1 | 9/2016 |

* cited by examiner post-conversion map
(crop yield)

crop yield in P1 = Z1
crop yield in P2 = Z2

| P 1 | P 5 | P 9 | P 13 |
| P 2 | P 6 | P 10 | P 14 |
| P 3 | P 7 | P 11 | P 15 |
| P 4 | P 8 | P 12 | P 16 | per-surface area unit
crop yield polygon map per-surface area unit crop yield for Pg5 = Yg5
per-surface area unit crop yield for Pg6 = Yg6
per-surface area unit crop yield for Pg7 = Yg7
per-surface area unit crop yield for Pg8 = Yg8 post-conversion map
(per-surface area unit crop yield)

per-surface area unit
crop yield for P1 = Y1 per-surface area unit
crop yield for P2 = Y2

| P 1 | P 5 | P 9 | P 13 |
| P 2 | P 6 | P 10 | P 14 |
| P 3 | P 7 | P 11 | P 15 |
| P 4 | P 8 | P 12 | P 16 | protein content
for Pg9 = Xg9 protein content
for Pg10 = Xg10 protein content
for Pg11 = Xg11 post-conversion map
(protein content)

protein content
for P1 = X1 protein content
for P2 = X2

| P 1 | P 5 | P 9 | P 13 |
| P 2 | P 6 | P 10 | P 14 |
| P 3 | P 7 | P 11 | P 15 |
| P 4 | P 8 | P 12 | P 16 |

Fig.13

| segment | R1 | R2 | R3 | R4 | R5 | R6 |
|---|---|---|---|---|---|---|
| fertilizer level | m1 | m2 | m3 | m4 | m5 | m6 | field polygon map

Fig.20

| obtainment timing | data obtainment position information | crop yield | protein content | work information | work width | speed |
|---|---|---|---|---|---|---|
| t18 | G18 | W18 | Q18 | working | S4 | V18 |
| t19 | G19 | W19 | Q19 | working | S4 | V19 |
| t20 | none | W20 | Q20 | working | S4 | V20 |
| t21 | none | W21 | Q21 | working | S4 | V21 |
| t22 | none | W22 | Q22 | working | S4 | V22 |
| t23 | none | none | none | not working | none | V23 |
| t24 | none | none | none | not working | none | V24 |
| t25 | none | none | none | not working | none | V25 |
| t26 | none | W26 | Q26 | working | S4 | V26 |
| t27 | none | W27 | Q27 | working | S4 | V27 |
| t28 | G28 | W28 | Q28 | working | S4 | V28 |
| t29 | G29 | W29 | Q29 | working | S4 | V29 |
| t30 | G30 | W30 | Q30 | working | S4 | V30 |

Fig.21

| obtainment timing | data obtainment position information | crop yield | protein content | work information | work width | speed |
|---|---|---|---|---|---|---|
| t32 | G32 | W32 | Q32 | working | S5 | V32 |
| t33 | G33 | W33 | Q33 | working | S5 | V33 |
| t34 | none | W34 | Q34 | working | S5 | V34 |
| t35 | none | W35 | Q35 | working | S5 | V35 |
| t36 | G36 | W36 | Q36 | working | S5 | V36 |
| t37 | G37 | W37 | Q37 | working | S5 | V37 |
| ⋮ | ⋮ | ⋮ | ⋮ | ⋮ | ⋮ | ⋮ | position | travel direction

G32 Pg32
G33 Pg33

G36 Pg36
G37 Pg37

⟹ position | travel direction

G32 Pg32
G33 Pg33
Pg34
G36 Pg36
G37 Pg37

FIELD MAP GENERATING SYSTEM

CROSS-REFERENCE TO RELATED APPLICATIONS

This application is the United States national phase of International Application No. PCT/JP2018/021867 filed Jun. 7, 2018, and claims priority to Japanese Patent Application Nos. 2017-124605 and 2017-124607, both filed Jun. 26, 2017, the disclosures of which are hereby incorporated by reference in their entirety.

TECHNICAL FIELD

The present invention relates to a field map generating system that generates a map on the basis of data obtained by a work vehicle such as an agricultural vehicle.

BACKGROUND ART

The system disclosed in Patent Document 1 is already known as an example of such a field map generating system. In this field map generating system, a field is divided into predetermined sizes before an agricultural vehicle such as a harvester carries out harvesting work. The field is divided into a plurality of minute segments as a result.

These minute segments divide the field at equal distance intervals. Data such as the crop yield can be obtained at equal distance intervals in accordance with the distance intervals of the minute segments, and that obtained data can then be associated with the corresponding minute segment. Position information of the agricultural vehicle and data such as the crop yield can be obtained simultaneously as time passes. Also, the obtained data and position information can be associated, and the data such as the crop yield can be associated with the corresponding minute segments. This makes it possible to generate an accurate field map.

PRIOR ART DOCUMENTS

Patent Document

Patent Document 1: JP 2014-67308A

DISCLOSURE OF THE INVENTION

Problems the Invention is to Solve

However, when data such as the crop yield is obtained at equal distance intervals, the obtained data tends to be less accurate than data obtained in each of units of time. This is caused by calculation error for the distance traveled by the harvester being present in the data obtained at equal distance intervals, and the like.

It is thus conceivable to obtain the data such as the crop yield in each of units of time.

However, a harvester in a field typically does not travel at a constant speed. As such, data such as the crop yield is obtained in each of units of time in the field map generating system according to Patent Document 1, the positions where the data is obtained will not be at equal distance intervals. The positions where the data is obtained will therefore not match the way in which the field is segmented, and for example, there will be some minute segments where no data has been obtained. It is assumed that this will result in the generation of a low-accuracy field map that does not match the actual state of the field.

Furthermore, when obtaining position information of the agricultural vehicle along with data such as the crop yield, there are situations where the position information of the agricultural vehicle temporarily cannot be obtained, due to temporary problems with the device that obtains the position information of the agricultural vehicle, for example. The data such as the crop yield obtained at that time will therefore have no corresponding position information, and thus cannot be associated with a minute segment. The data unassociated with a minute segment will not be reflected in the generated field map.

This causes a drop in the accuracy of the generated field map.

An object of the present invention is to provide a field map generating system capable of generating an accurate field map.

Means to Solve the Problems

A feature of one embodiment of the present invention includes: a crop data obtaining unit that obtains crop data, the crop data being data pertaining to a crop harvested by a harvester, over time; a position information obtaining unit that obtains position information, the position information indicating the position where the crop is harvested in a field, over time; a polygon constructing unit that constructs a polygon on the basis of a work width and a speed of the harvester, for each piece of the crop data obtained by the crop data obtaining unit; a data assigning unit that assigns the crop data or crop information based on the crop data to each polygon constructed by the polygon constructing unit; a position information assigning unit that assigns the position information to each polygon constructed by the polygon constructing unit; and a field map generating unit that generates a field polygon map, the field polygon map being an aggregate of the polygons, by aggregating the polygons.

According to this configuration, the polygon constructing unit constructs polygons for each piece of crop data, rather than the crop data being obtained in accordance with a method for segmenting the field which has been determined in advance. It is therefore not necessary to obtain the crop data at equal distance intervals, which makes it possible to avoid a situation in which the accuracy of the crop data drops due to the crop data being obtained at equal distance intervals.

Furthermore, because the polygon constructing unit constructs the polygons for each piece of crop data instead of the field being segmented in advance, a situation where the positions where the crop data is obtained do not fit with the way in which the field is segmented can be avoided. This makes it possible to generate a field map that corresponds to the actual situation.

Thus according to the present invention, a situation in which the accuracy of the crop data or the crop information based on the crop data drops can be avoided, and a field map that corresponds to the actual situation can be generated as well.

Furthermore, preferably, one embodiment of the present invention further includes: a working state determining unit that determines whether or not each of a plurality of regions of a work device included in the harvester, the regions arranged in a left-right direction, are in a working state; and a work width calculating unit that calculates a work width of the harvester on the basis of the result of the determination by the working state determining unit.

When constructing a polygon, it is conceivable to have the width of the polygon match the work width. In this case, it is conceivable to use a left-right width of the work device as the work width when constructing the polygon.

However, a situation in which only the left half of the work device is actually working or the like may arise. In other words, there are cases where only part of the work device is working. As such, the left-right width of the work device is not necessarily the same as the work width.

Here, according to the foregoing configuration, the accuracy of the work width is favorable, compared to a case where the left-right width of the work device is used as the work width when constructing the polygon. As a result, the width of the polygon constructed by the polygon constructing unit is accurate.

Furthermore, in one embodiment of the present invention, it is preferable that the crop data obtaining unit be capable of obtaining a plurality of types of crop data over time; and that the field map generating unit generate the field polygon map for each type of the crop data.

When the crop data obtaining unit can obtain a plurality of types of crop data over time, if the plurality of types of crop data are obtained at the same timings, associating the plurality of types of crop data, or a plurality of types of crop information based on the plurality of types of crop data, with each polygon makes it possible to generate one type of field polygon map indicating distributions of the plurality of types of crop data or crop information throughout the field, even if the field map generating unit can only generate one type of field polygon map.

However, when the field map generating unit can only generate one type of field polygon map and the various types of crop data are obtained at different timings, the field map generating unit can only generate a field polygon map for one type of crop data or crop information among the plurality of types of crop data or crop information. This is because when the various types of crop data are obtained at different timings, the polygons which are constructed will be different as well. Thus the operator can only know the distribution of one of the types of crop data or crop information among the plurality of types of crop data or crop information.

Here, according to the foregoing configuration, the field map generating unit generates the field polygon map for each type of the crop data. Thus even if the various types of crop data are obtained at different timings, a field polygon map can be generated for each of those various types of crop data or crop information. As a result, the operator can know the distribution, throughout the field, of each of the plurality of types of crop data or crop information.

Furthermore, in one embodiment of the present invention, it is preferable that the crop data obtaining unit be capable of obtaining the crop yield over time as the crop data; and that the data assigning unit assign the crop yield to the polygons as the crop data.

According to this configuration, the field map generating unit can generate a field polygon map indicating a distribution of the crop yield throughout the field. As a result, the operator can know the distribution of the crop yield throughout the field.

Furthermore, in one embodiment of the present invention, it is preferable that the crop data obtaining unit be capable of obtaining the crop yield over time as the crop data; and that the data assigning unit assign a per-surface area unit crop yield, calculated by dividing the crop yield obtained by the crop data obtaining unit by a field surface area corresponding to the polygon to which the per-surface area unit crop yield is to be assigned, to the polygons, as the crop information.

According to this configuration, the field map generating unit can generate a field polygon map indicating a distribution of the per-surface area unit crop yield throughout the field. As a result, the operator can know the distribution of the per-surface area unit crop yield throughout the field.

Furthermore, in one embodiment of the present invention, it is preferable that the crop data obtaining unit be capable of obtaining a quality value, the quality value being a value indicating the quality of the crop, over time as the crop data; and that the data assigning unit assign the quality value to the polygons as the crop data.

According to this configuration, a field polygon map indicating the distribution of the quality value throughout the field can be generated. As a result, the operator can know the distribution of the quality value throughout the field.

Furthermore, preferably, one embodiment of the present invention further includes a map converting unit that converts the field polygon map into a post-conversion map segmented into a plurality of index segments different from the polygons; and the map converting unit calculates the crop yield to be assigned to each index segment by adding together surface area-appropriated crop yields of the parts of each polygon included in the index segments.

The surface area-appropriated crop yield of a part in a single polygon present in a single index segment is calculated as the product of the crop yield assigned to the polygon, and the ratio of the field surface area corresponding to the each part in the polygon where the index segment is present to the field surface area corresponding to the entire polygon.

Then, for each polygon overlapping with a single index segment, the surface area-appropriated crop yield of each part where that index segment is present is calculated, and then the surface area-appropriated crop yields are added together to accurately calculate the crop yield in that index segment.

Here, according to the foregoing configuration, the map converting unit calculates the crop yield to be assigned to each index segment by adding together the surface area-appropriated crop yields of the parts of each polygon included in the index segments. Accordingly, accurate crop yields are assigned to the index segments.

Furthermore, preferably, one embodiment of the present invention further includes a map converting unit that converts the field polygon map into a post-conversion map segmented into a plurality of index segments different from the polygons; and the map converting unit calculates a per-surface area unit crop yield to be assigned to each index segment by taking the sum of surface area-appropriated crop yields of the parts of each polygon included in the index segments and dividing that sum by a field surface area corresponding to the index segment to which the per-surface area unit crop yield is to be assigned.

As described above, for each polygon overlapping with a single index segment, the surface area-appropriated crop yield of each part where that index segment is present is calculated, and then the surface area-appropriated crop yields are added together to accurately calculate the crop yield in that index segment.

Then, the per-surface area unit crop yield for that index segment can be calculated accurately by dividing the crop yield calculated in this manner by the field surface area corresponding to that index segment.

Here, according to the foregoing configuration, the map converting unit calculates the per-surface area unit crop yield to be assigned to each index segment by taking the sum of surface area-appropriated crop yields of the parts of each polygon included in the index segments and dividing that sum by a field surface area corresponding to the index segment to which the per-surface area unit crop yield is to be assigned. Accordingly, accurate per-surface area unit crop yields are assigned to the index segments.

Furthermore, preferably, one embodiment of the present invention further includes a map converting unit that converts the field polygon map into a post-conversion map segmented into a plurality of index segments different from the polygons; the map converting unit calculates the quality value to be assigned to each index segment as a mean value of the quality values assigned to polygons, among the polygons, included in the index segments; and when calculating the mean value, the map converting unit carries out weighting using a field surface area corresponding to the part of each polygon present in each index segment.

If the quality value for a single index segment is calculated as a mean value of the quality values assigned to the polygons overlapping with that index segment, the quality value in that index segment can be calculated accurately.

The degree to which the quality value assigned to a single polygon overlapping with that index segment affects the mean value depends on the size of the field surface area corresponding to the part of the index segment present in that polygon.

As such, according to the foregoing configuration, when calculating the mean value, the map converting unit carries out weighting using the field surface area corresponding to the part of each polygon present in each index segment. This makes it possible to calculate the mean value taking into account the degree to which the quality value assigned to each polygon affects the mean value. Accordingly, accurate quality values are assigned to the index segments.

Furthermore, in one embodiment of the present invention, it is preferable that the map converting unit determine the size of the index segments in accordance with the work width of a different work vehicle from the harvester.

According to this configuration, in the post-conversion map, the field can be segmented according to the work width of a different work vehicle. This makes it easier to appropriately determine the details of the work performed by the different work vehicle on the basis of the post-conversion map.

A feature of one embodiment of the present invention is a method of generating a field map pertaining to a crop in a field that is harvested by a traveling harvester, the method including: a step of obtaining position information of the traveling harvester over time; a step of obtaining crop data of the crop over time; a step of creating a polygon on the basis of the travel state of the harvester at the time when the crop data is obtained; a step of assigning the obtained crop data to the corresponding polygon; a step of generating a field map for the entire field by aggregating the polygons; a step of estimating a plurality of index segments that divide the field; and a step of converting the field map into a post-conversion map in which the crop data is assigned to the index segments.

According to this method, the polygon constructing unit constructs polygons for each piece of crop data, rather than the crop data being obtained in accordance with a method for segmenting the field which has been determined in advance. It is therefore not necessary to obtain the crop data at equal distance intervals, which makes it possible to avoid a situation in which the accuracy of the crop data drops due to the crop data being obtained at equal distance intervals.

Furthermore, because the polygon constructing unit constructs the polygons for each piece of crop data instead of the field being segmented in advance, a situation where the positions where the crop data is obtained do not fit with the way in which the field is segmented can be avoided. This makes it possible to generate a first field map that corresponds to the actual situation.

Furthermore, a post-conversion map can be generated by converting the field map. In the post-conversion map, the crop data is assigned to index segments, which can be set as desired. Thus by setting the index segments to be suited to the management of the crop data, a post-conversion map suited to the management can be generated accurately.

Furthermore, in one embodiment of the present invention, it is preferable that the polygon be created on the basis of a work width of the harvester and a speed of the harvester, the work width and the speed serving as the travel state.

According to this configuration, the width of the polygon can be taken as the work width of the harvester. At the same time, the length of the polygon can be found from the product of the speed of the harvester and the obtainment time interval of the crop data. As a result, an accurate field map can be generated with ease.

Furthermore, in one embodiment of the present invention, it is preferable that the crop data be a crop yield of a harvested crop; and that the crop yield to be assigned to each index segment be calculated by adding together surface area-appropriated crop yields of the parts of each polygon included in the index segments.

According to this configuration, it is easy to ensure that the field map can be converted into a post-conversion map that is suited to management of the crop yield and accurate.

Furthermore, in one embodiment of the present invention, it is preferable that the crop data be a per-surface area unit crop yield of a harvested crop; and that the per-surface area unit crop yield to be assigned to each index segment be calculated by taking the sum of surface area-appropriated crop yields of the parts of each polygon included in the index segments and dividing that sum by a field surface area corresponding to the index segment to which the per-surface area unit crop yield is to be assigned.

According to this configuration, it is easy to ensure that the field map can be converted into a post-conversion map that is suited to the management of the per-surface area unit crop yield and accurate.

Furthermore, in one embodiment of the present invention, it is preferable that the crop data be a quality value of a harvested crop; that the quality value to be assigned to each index segment be calculated as a mean value of the quality values assigned to the polygons included in the index segments; and that when calculating the mean value, weighting be carried out using a field surface area corresponding to the part of each polygon present in each index segment.

According to this configuration, it is easy to ensure that the field map can be converted into a post-conversion map that is suited to the management of the quality value of the crop and accurate.

A feature of one embodiment of the present invention includes: a data obtaining unit that, in a work vehicle that uses a work device to carry out agricultural work while traveling in a field, obtains, as obtained data, at least one of operation information, which is information pertaining to the operation of the machine, field information, which is information pertaining to the field, and crop information, which is information pertaining to a crop; a position information obtaining unit capable of obtaining data obtainment position information, which is position information of the work vehicle at the time when the obtained data is obtained by the data obtaining unit; a polygon constructing unit that constructs a polygon on the basis of the data obtainment position information, a work width of the work device, and an obtainment timing of the obtained data by the data obtaining unit; a data assigning unit that assigns the obtained data to each polygon constructed by the polygon constructing unit; and a field map generating unit that generates a field polygon map, the field polygon map being an aggregate of the polygons, by aggregating the polygons, wherein if the data obtainment position information has not been obtained by the position information obtaining unit, the polygon constructing unit complementarily constructs a polygon corresponding to the timing at which the data obtainment position information was not obtained on the basis of polygons corresponding to the timings before and after the timing at which the data obtainment position information was not obtained, and the data assigning unit assigns the obtained data corresponding to the timing at which the data obtainment position information was not obtained to the complementarily-constructed polygon.

According to this configuration, the polygon constructing unit constructs a polygon, and the data assigning unit assigns the obtained data to the constructed polygon, on the basis of the data obtainment position information, the work width of the work device, and the obtainment timing of the obtained data by the data obtaining unit.

If the data obtainment position information has not been obtained, the polygon constructing unit complementarily constructs a polygon corresponding to the timing at which the data obtainment position information was not obtained, on the basis of the polygons corresponding to the timings before and after the timing at which the data obtainment position information was not obtained. The obtained data corresponding to the timing at which the data obtainment position information was not obtained is then assigned to the complementarily-constructed polygon.

In other words, in one embodiment of the present invention, the obtained data is associated with a polygon even if there is no corresponding data obtainment position information. Accordingly, obtained data for which there is no corresponding data obtainment position information is reflected in the generated field map.

Thus according to one embodiment of the present invention, an accurate field map can be generated even when the position information of the work vehicle has temporarily not been obtained.

Furthermore, in one embodiment of the present invention, it is preferable that when complementarily constructing a polygon, the polygon constructing unit complementarily construct a polygon corresponding to the timing at which the data obtainment position information was not obtained, as one or more polygons located between the polygon corresponding to the timing before the timing at which the data obtainment position information was not obtained, and the polygon corresponding to the timing after the timing at which the data obtainment position information was not obtained, in a travel route of the work vehicle.

If the data obtainment position information has not been obtained, it is thought that at the timing at which the data obtainment position information was not obtained, the work vehicle was traveling along a travel route between a field position indicated by the data obtainment position information obtained at the timing before the information was not obtained and a field position indicated by the data obtainment position information obtained at the timing after the information was not obtained.

Here, according to the foregoing configuration, the complementarily-constructed polygon is complementarily constructed between the polygons corresponding to the timings before and after the timing at which the data obtainment position information was not obtained, in the travel route of the work vehicle. Accordingly, it is easier for there to be less error between the field position corresponding to the complementarily-constructed polygon and the field position where the work vehicle was actually located. This makes the field map more accurate.

Furthermore, preferably, one embodiment of the present invention further includes a vehicle speed detecting unit that detects a speed of the work vehicle; and if a state in which the data obtainment position information is not obtained has continued for a consecutive plurality of timings, the polygon constructing unit complementarily constructs a consecutive plurality of polygons so as to correspond to each of the consecutive plurality of timings, and also determines lengths of the complementarily-constructed polygons with respect to a travel direction of the work vehicle on the basis of the speed detected by the vehicle speed detecting unit and an obtainment time interval of the obtained data by the data obtaining unit.

According to this configuration, if a state in which the data obtainment position information is not obtained has continued for a consecutive plurality of timings, the polygon constructing unit complementarily constructs a consecutive plurality of polygons so as to correspond to each of the consecutive plurality of timings.

Accordingly, the parts where the data obtainment position information has not been obtained are more detailed in the generated field map than when the polygon constructing unit complementarily constructs a single polygon corresponding to the consecutive plurality of timings.

This makes it possible to generate a field map indicating, in detail, a distribution of the obtained data for parts in the field where the data obtainment position information has not been obtained.

Furthermore, in the present invention, it is preferable that if a state in which the data obtainment position information is not obtained has continued for a consecutive plurality of timings, the polygon constructing unit complementarily construct a single polygon corresponding to the consecutive plurality of timings, and the data assigning unit take a value obtained by averaging or adding the plurality of pieces of obtained data corresponding to the consecutive plurality of timings according to attributes of the obtained data and assigns that value to the single complementarily-constructed polygon.

In a configuration in which, if a state where the data obtainment position information is not obtained has continued for a consecutive plurality of timings, a consecutive plurality of polygons are complementarily constructed so as to correspond to those timings, it is necessary to determine the length of each complementarily-constructed polygon with respect to the travel direction of the work vehicle.

For example, if the length of each complementarily-constructed polygon with respect to the travel direction of the work vehicle is determined on the basis of the speed of the work vehicle and the obtainment time interval of the obtained data, it is necessary for the field map generating system to obtain the speed of the work vehicle and the obtainment time interval of the obtained data, and to have a configuration for determining the length of each complementarily-constructed polygon with respect to the travel direction of the work vehicle. This tends to complicate the configuration of the field map generating system.

Here, according to the foregoing configuration, the polygon constructing unit complementarily constructs a single polygon corresponding to a consecutive plurality of timings. Accordingly, the configuration of the field map generating system can be simplified as compared to a configuration in which a consecutive plurality of polygons are complementarily-constructed so as to correspond to respective ones of the consecutive plurality of timings.

Furthermore, in one embodiment of the present invention, it is preferable that the obtained data obtained by the data obtaining unit include working information, indicating whether the work device is in a working state or a non-working state, as the operation information; and if a state in which the data obtainment position information is not obtained has continued for a consecutive plurality of timings, and a timing at which the work device is in a non-working state is included in the consecutive plurality of timings, the polygon constructing unit complementarily construct one or more polygons on a line extending toward a forward side of the polygon located to the rear in the travel direction of the work vehicle for a timing before the timing at which the work device is in a non-working state, and complementarily construct one or more polygons on a line extending toward a rearward side of the polygon located to the front in the travel direction of the work vehicle for a timing after the timing at which the work device is in a non-working state.

If a state in which the data obtainment position information is not obtained continues for a consecutive plurality of timings and a timing at which the work device is in a non-working state is included in those timings, it is thought that at timings before the timing at which the work device was in the non-working state, the work vehicle was traveling along a line extending forward from the field position corresponding to the polygon located rearward in the travel direction of the work vehicle. Furthermore, it is thought that at timings after the timing at which the work device was in the non-working state, the work vehicle was traveling along a line extending rearward from the field position corresponding to the polygon located forward in the travel direction of the work vehicle.

Here, according to the foregoing configuration, the complementarily-constructed polygons are complementarily constructed on a line extending toward the forward side of the polygon located to the rear in the travel direction of the work vehicle, for timings before the timing at which the work device was in the non-working state, and are complementarily constructed on a line extending toward the rearward side of the polygon located to the front in the travel direction of the work vehicle, for timings after the timing at which the work device was in the non-working state.

Accordingly, it is easier for there to be less error between the field position corresponding to the complementarily-constructed polygon and the field position where the work vehicle was actually located. This makes the field map more accurate.

Furthermore, in one embodiment of the present invention, it is preferable that the data obtaining unit be capable of obtaining a crop yield over time as the obtained data; that the data assigning unit assign the crop yield to the polygons as the obtained data; that the system further include a map converting unit that converts the field polygon map into a post-conversion map segmented into a plurality of index segments different from the polygons; and that the map converting unit calculate the crop yield to be assigned to each index segment by adding together surface area-appropriated crop yields of the parts of each polygon included in the index segments.

According to this configuration, the polygon constructing unit constructs polygons for each piece of obtained data, rather than the crop data being obtained in accordance with a method for segmenting the field which has been determined in advance. It is therefore not necessary to obtain the obtained data at equal distance intervals, which makes it possible to avoid a situation in which the accuracy of the obtained data drops due to the obtained data being obtained at equal distance intervals.

The surface area-appropriated crop yield of a part in a single polygon present in a single index segment is calculated as the product of the crop yield assigned to the polygon, and the ratio of the field surface area corresponding to the each part in the polygon where the index segment is present to the field surface area corresponding to the entire polygon.

Then, for each polygon overlapping with a single index segment, the surface area-appropriated crop yield of each part where that index segment is present is calculated, and then the surface area-appropriated crop yields are added together to accurately calculate the crop yield in that index segment.

Here, according to the foregoing configuration, the map converting unit calculates the crop yield to be assigned to each index segment by adding together the surface area-appropriated crop yields of the parts of each polygon included in the index segments. Accordingly, accurate crop yields are assigned to the index segments.

Furthermore, in one embodiment of the present invention, it is preferable that the data obtaining unit be capable of obtaining a crop yield over time as the obtained data; that the data assigning unit assign a per-surface area unit crop yield, calculated by dividing the crop yield obtained by the data obtaining unit by a field surface area corresponding to the polygon to which the per-surface area unit crop yield is to be assigned, to the polygons, as the crop information; that the system further include a map converting unit that converts the field polygon map into a post-conversion map segmented into a plurality of index segments different from the polygons; and that the map converting unit calculate a per-surface area unit crop yield to be assigned to each index segment by taking the sum of surface area-appropriated crop yields of the parts of each polygon included in the index segments and dividing that sum by a field surface area corresponding to the index segment to which the per-surface area unit crop yield is to be assigned.

As described above, for each polygon overlapping with a single index segment, the surface area-appropriated crop yield of each part where that index segment is present is calculated, and then the surface area-appropriated crop yields are added together to accurately calculate the crop yield in that index segment.

Then, the per-surface area unit crop yield for that index segment can be calculated accurately by dividing the crop yield calculated in this manner by the field surface area corresponding to that index segment.

Here, according to the foregoing configuration, the map converting unit calculates the per-surface area unit crop yield to be assigned to each index segment by taking the sum of surface area-appropriated crop yields of the parts of each polygon included in the index segments and dividing that sum by a field surface area corresponding to the index segment to which the per-surface area unit crop yield is to be assigned. Accordingly, accurate per-surface area unit crop yields are assigned to the index segments.

Furthermore, in one embodiment of the present invention, it is preferable that the data obtaining unit be capable of obtaining a quality value, the quality value being a value indicating the quality of the crop, over time as the obtained data; that the data assigning unit assign the quality value to the polygons as the obtained data; that the system further include a map converting unit that converts the field polygon map into a post-conversion map segmented into a plurality of index segments different from the polygons; that the map converting unit calculate the quality value to be assigned to each index segment as a mean value of the quality values assigned to polygons, among the polygons, included in the index segments; and that when calculating the mean value, the map converting unit carry out weighting using a field surface area corresponding to the part of each polygon present in each index segment.

If the quality value for a single index segment is calculated as a mean value of the quality values assigned to the polygons overlapping with that index segment, the quality value in that index segment can be calculated accurately.

The degree to which the quality value assigned to a single polygon overlapping with that index segment affects the mean value depends on the size of the field surface area corresponding to the part of the index segment present in that polygon.

As such, according to the foregoing configuration, when calculating the mean value, the map converting unit carries out weighting using the field surface area corresponding to the part of each polygon present in each index segment. This makes it possible to calculate the mean value taking into account the degree to which the quality value assigned to each polygon affects the mean value. Accordingly, accurate quality values are assigned to the index segments.

Additionally, a feature of one embodiment of the present invention is a method of generating a field map pertaining to a crop in a field that is harvested by a traveling harvester, the method including: a step of obtaining crop data of the crop over time; a step of obtaining data obtainment position information of the harvester during travel when obtaining the crop data of the crop; a step of creating a polygon on the basis of the data obtainment position information of the harvester at the time when the crop data is obtained; a step of assigning the obtained crop data to the corresponding polygon; if a polygon has not been created due to the data obtainment position information of the harvester not being obtained when the crop data is obtained, a step of complementarily creating the polygon that was not created; a step of assigning corresponding crop data to the complementarily-created polygon; and a step of generating a field map for the entire field by aggregating the polygons, wherein a polygon corresponding to the timing at which the data obtainment position information was not obtained is complementarily created on the basis of the polygons corresponding to the timings before and after the timing at which the data obtainment position information was not obtained, and the data assigning unit assigns the obtained data corresponding to the timing at which the data obtainment position information was not obtained to the complementarily-constructed polygon.

According to the present invention, the polygon constructing unit constructs a polygon, and the crop data is assigned to the constructed polygon, on the basis of the data obtainment position information, the work width of the work device, and the obtainment timing of the crop data by the data obtaining unit.

If the data obtainment position information has not been obtained, the polygon constructing unit complementarily constructs a polygon corresponding to the timing at which the data obtainment position information was not obtained, on the basis of the polygons corresponding to the timings before and after the timing at which the data obtainment position information was not obtained. The crop data corresponding to the timing at which the data obtainment position information was not obtained is then assigned to the complementarily-constructed polygon.

In other words, in the present invention, the crop data is associated with a polygon even if there is no corresponding data obtainment position information. Accordingly, crop data for which there is no corresponding data obtainment position information is reflected in the generated field map.

Thus according to the present invention, an accurate field map can be generated even when the position information of the work vehicle has temporarily not been obtained.

BRIEF DESCRIPTION OF THE DRAWINGS

FIG. 13 is a diagram illustrating a fertilizer level table.

FIG. 20 is a diagram illustrating the complementary construction of polygons in a case C3.

FIG. 21 is a diagram illustrating the complementary construction of polygons in a case C4, according to a first variation on a second embodiment.

BEST MODE FOR CARRYING OUT THE INVENTION

First Embodiment

Embodiments for carrying out the present invention will be described on the basis of the drawings. Note that in the following descriptions, the direction of an arrow F in FIG. 3 corresponds to "front", the direction of an arrow B corresponds to "back", the direction of an arrow L in FIG. 3 corresponds to "left", and the direction of an arrow R corresponds to "right" (the same applies to the second embodiment as well).

Overall Configuration of Field Map Generating System

Figure 1:
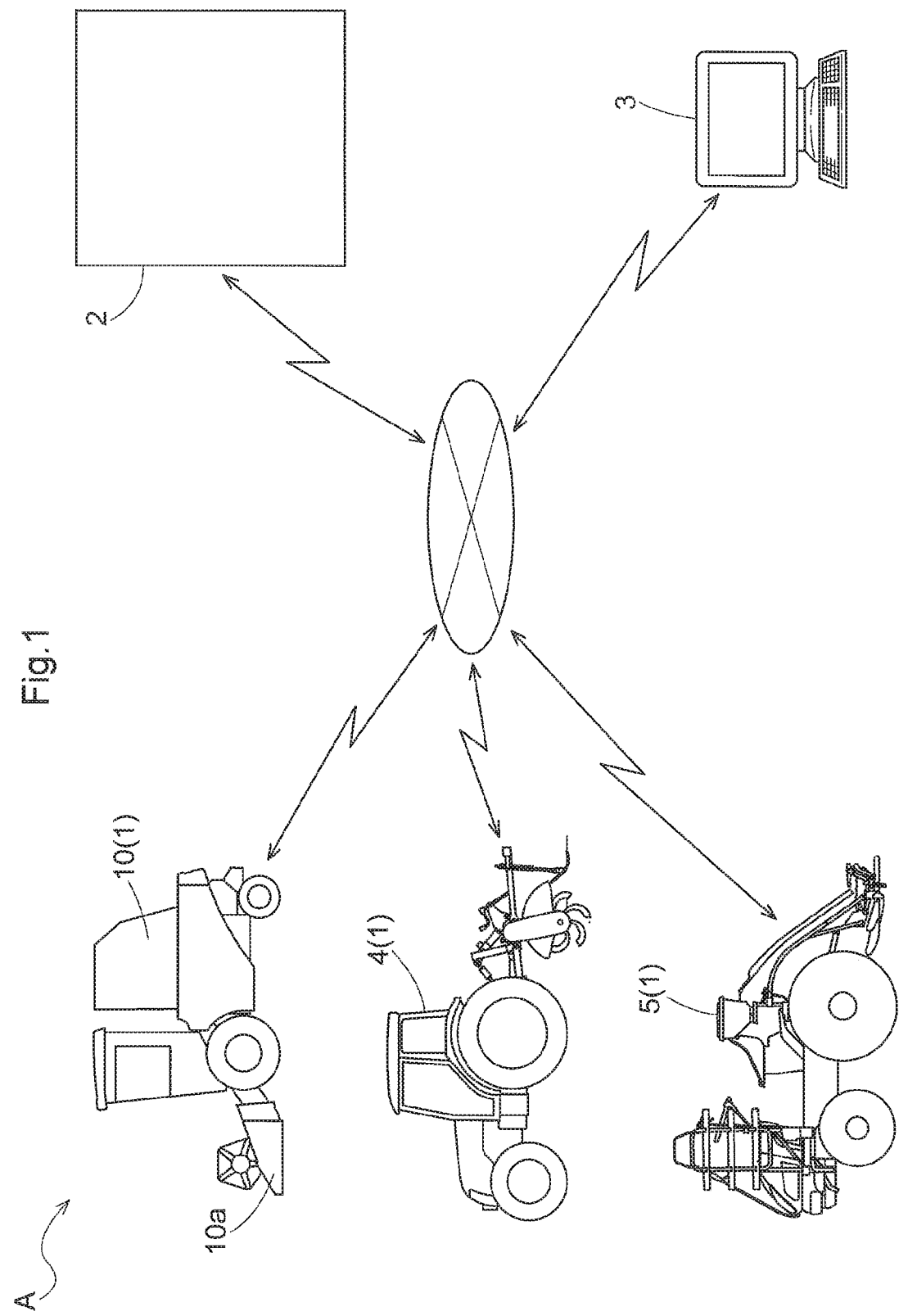
FIG. 1 is an overall view of a field map generating system.

As illustrated in FIG. 1, a field map generating system A includes various types of work vehicles 1, such as agricultural vehicles or the like, and a management server 2. The various work vehicles 1 and the management server 2 are configured to be capable of communicating with each other. An operating terminal 3, which is operated by an operator, is also configured to be capable of communicating with the management server 2. The operating terminal 3 is constituted by a personal computer installed in a farm or the like, for example.

As illustrated in FIG. 1, the various work vehicles 1 include a combine 10 (corresponding to a "harvester" according to the present invention), a tractor 4, and a rice transplanter 5.

Configuration of Combine

Figure 2:
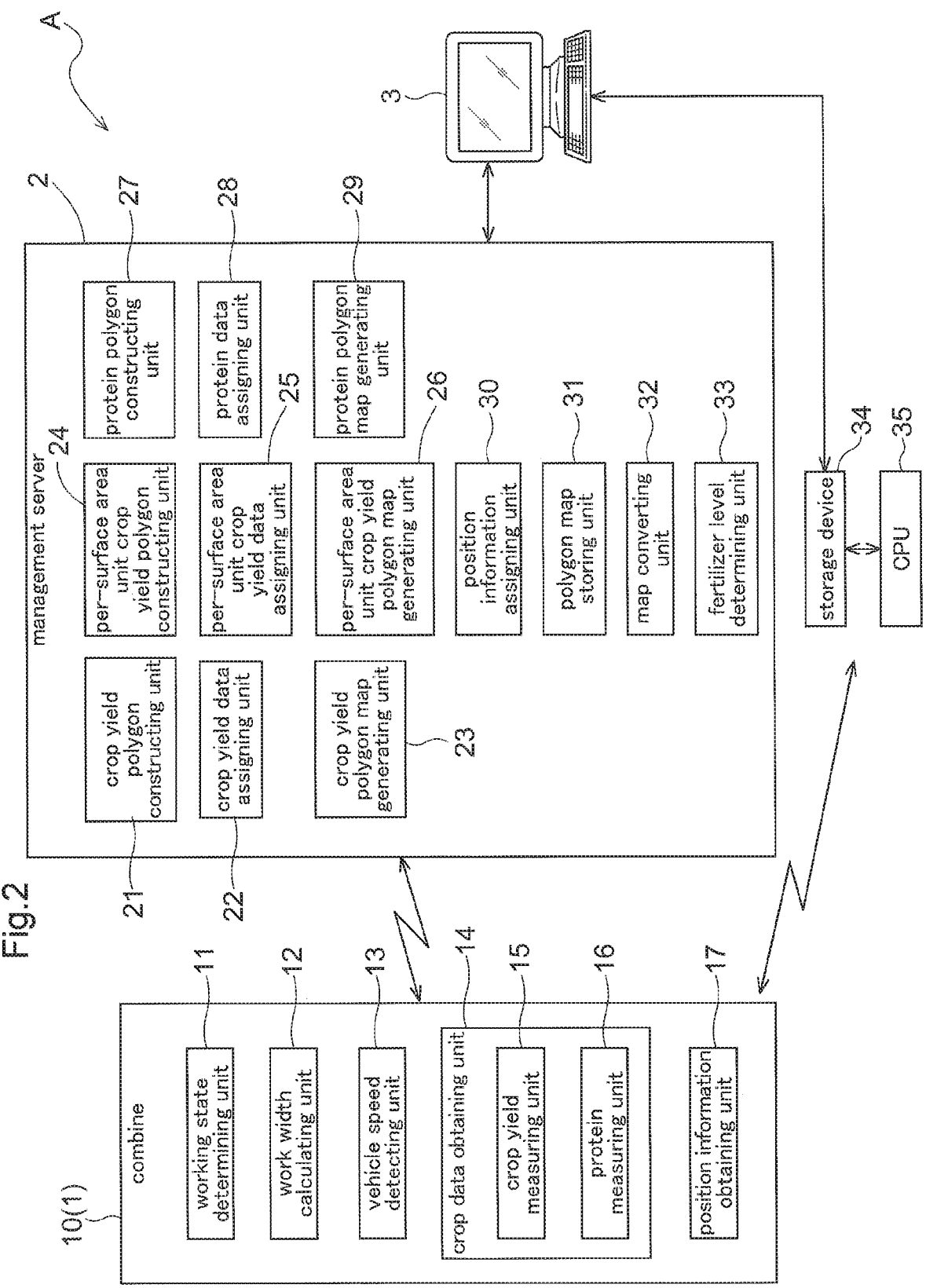
FIG. 2 is a block diagram illustrating the configuration of the field map generating system.

FIG. 2 illustrates the combine 10 as one example of the various work vehicles 1. As illustrated in FIG. 2, the combine 10 includes a working state determining unit 11, a work width calculating unit 12, a vehicle speed detecting unit 13, a crop data obtaining unit 14, and a position information obtaining unit 17. The crop data obtaining unit 14 includes a crop yield measuring unit 15 and a protein measuring unit 16.

Figure 3:
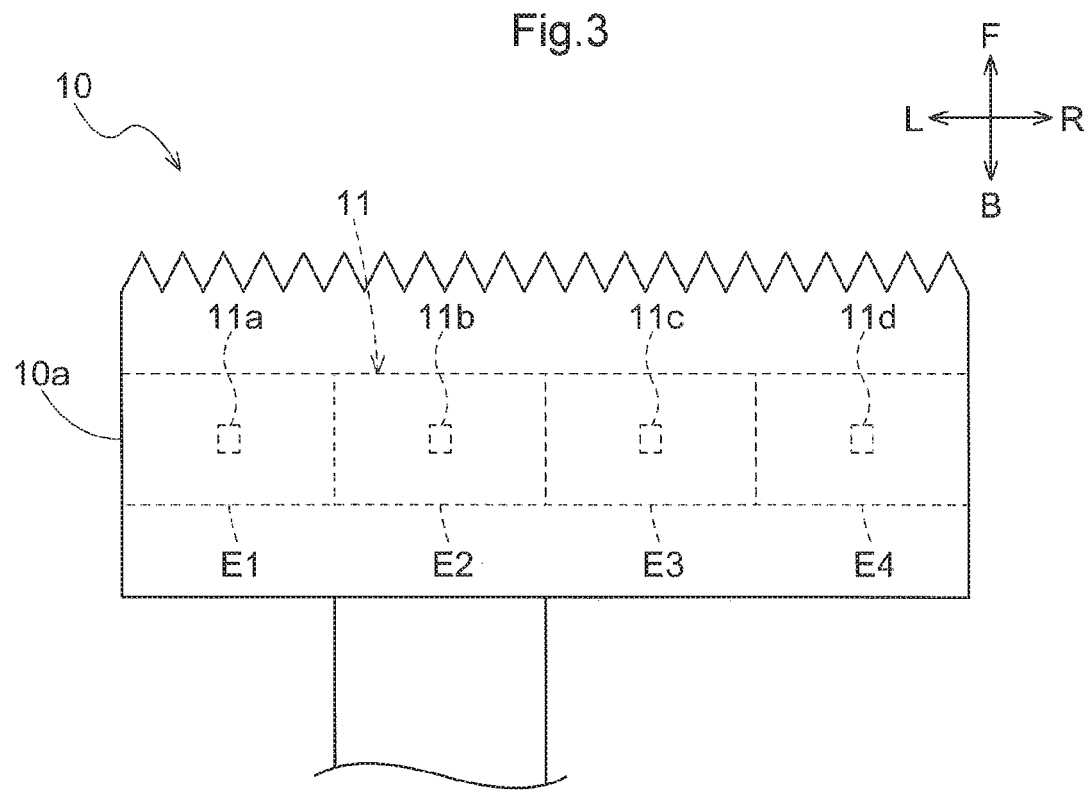
FIG. 3 is a plan view illustrating the configuration of a working state determining unit.

As illustrated in FIG. 3, the combine 10 includes a reaping unit 10a (corresponding to a "work device" according to the present invention). The reaping unit 10a is configured to reap the crops in the field. The working state determining unit 11 is attached to the reaping unit 10a.

The working state determining unit 11 includes a first determining unit 11a, a second determining unit 11b, a third determining unit 11c, and a fourth determining unit 11d. In the reaping unit 10a, regions E1, E2, E3, and E4 are arranged in the left-right direction, in that order from the left side.

The first determining unit 11a determines whether or not the region E1 is in a working state by detecting whether or not a crop has passed through the region E1. The second determining unit 11b determines whether or not the region E2 is in a working state by detecting whether or not a crop has passed through the region E2. The third determining unit 11c determines whether or not the region E3 is in a working state by detecting whether or not a crop has passed through the region E3. The fourth determining unit 11d determines whether or not the region E4 is in a working state by detecting whether or not a crop has passed through the region E4.

In other words, the first determining unit 11a, the second determining unit 11b, the third determining unit 11c, and the fourth determining unit 11d determine whether or not the corresponding regions E1, E2, E3, and E4 are in a working state.

Thus the field map generating system A includes the working state determining unit 11, which determines whether or not each of the plurality of regions E1, E2, E3, and E4, which are arranged along the left-right direction of the reaping unit 10a in the combine 10, is in a working state.

The determination results determined by the working state determining unit 11 are sent to the work width calculating unit 12. The work width calculating unit 12 calculates a work width of the combine 10 on the basis of the determination results from the working state determining unit 11.

For example, if it has been determined that all of the regions E1, E2, E3, and E4 are in a working state, the work width of the combine 10 is calculated as the width from the region E1 to the region E4. However, if it has been determined that the regions E1 and E2 are in a working state but the regions E3 and E4 are not in a working state, the work width of the combine 10 is calculated as the width from the region E1 to the region E2.

Thus the field map generating system A includes the work width calculating unit 12, which calculates the work width of the combine 10 on the basis of the determination results determined by the working state determining unit 11.

The vehicle speed detecting unit 13 is configured to detect the speed of the combine 10.

The crop yield measuring unit 15 measures the yield of the crops harvested by the combine 10 (corresponding to "crop data" according to the present invention) over time. Through this, the crop yield measuring unit 15 obtains the yield of the crops harvested by the combine 10 over time. For example, in the present embodiment, the crop yield measuring unit 15 measures the crop yield every second. In other words, the crop yield measured by the crop yield measuring unit 15 is the amount of the crop harvested in one second.

The protein measuring unit 16 measures the protein content of the crops harvested by the combine 10 (corresponding to "crop data" and a "quality value" according to the present invention) over time. Through this, the protein measuring unit 16 obtains the protein content of the crops harvested by the combine 10 over time. For example, in the present embodiment, the protein measuring unit 16 measures the protein content of the crop every two seconds.

Thus the field map generating system A includes the crop data obtaining unit 14 that obtains crop data, which is data pertaining to the crop harvested by the combine 10, over time.

The crop data obtaining unit 14 can obtain a plurality of types of crop data over time. The crop data obtaining unit 14 can obtain the crop yield over time as the crop data. The crop data obtaining unit 14 can obtain the protein content of the crop over time as the crop data.

The position information obtaining unit 17 obtains position information, which indicates the position where the crop is harvested in the field, over time. The position information obtaining unit 17 is constituted by a GPS, for example.

Thus the field map generating system A includes the position information obtaining unit 17 that obtains position information, which indicates the position where the crop is harvested in the field, over time.

Configuration of Management Server

The management server 2 includes a crop yield polygon constructing unit 21 (corresponding to a "polygon constructing unit" according to the present invention), a crop yield data assigning unit 22 (corresponding to a "data assigning unit" according to the present invention), a crop yield polygon map generating unit 23 (corresponding to a "field map generating unit" according to the present invention), a per-surface area unit crop yield polygon constructing unit 24 (corresponding to a "polygon constructing unit" according to the present invention), a per-surface area unit crop yield data assigning unit 25 (corresponding to a "data assigning unit" according to the present invention), a per-surface area unit crop yield polygon map generating unit 26 (corresponding to a "field map generating unit" according to the present invention), a protein polygon constructing unit 27 (corresponding to a "polygon constructing unit" according to the present invention), a protein data assigning unit 28 (corresponding to a "data assigning unit" according to the present invention), a protein polygon map generating unit 29 (corresponding to a "field map generating unit" according to the present invention), a position information assigning unit 30, a polygon map storing unit 31, a map converting unit 32, and a fertilizer level determining unit 33.

The work width of the combine 10 calculated by the work width calculating unit 12 is sent to the crop yield polygon constructing unit 21, the per-surface area unit crop yield polygon constructing unit 24, and the protein polygon constructing unit 27. The speed of the combine 10 detected by the vehicle speed detecting unit 13 is sent to the crop yield polygon constructing unit 21, the per-surface area unit crop yield polygon constructing unit 24, and the protein polygon constructing unit 27.

The crop yield polygon constructing unit 21 constructs a crop yield polygon each time the crop yield, which is obtained by the crop yield measuring unit 15, is obtained. For example, if the crop yield has been obtained five times as the combine 10 travels, the crop yield polygon constructing unit 21 constructs five crop yield polygons. At this time, the crop yield polygon constructing unit 21 constructs the crop yield polygons on the basis of the work width of the combine 10 and the speed of the combine 10.

Figure 4:
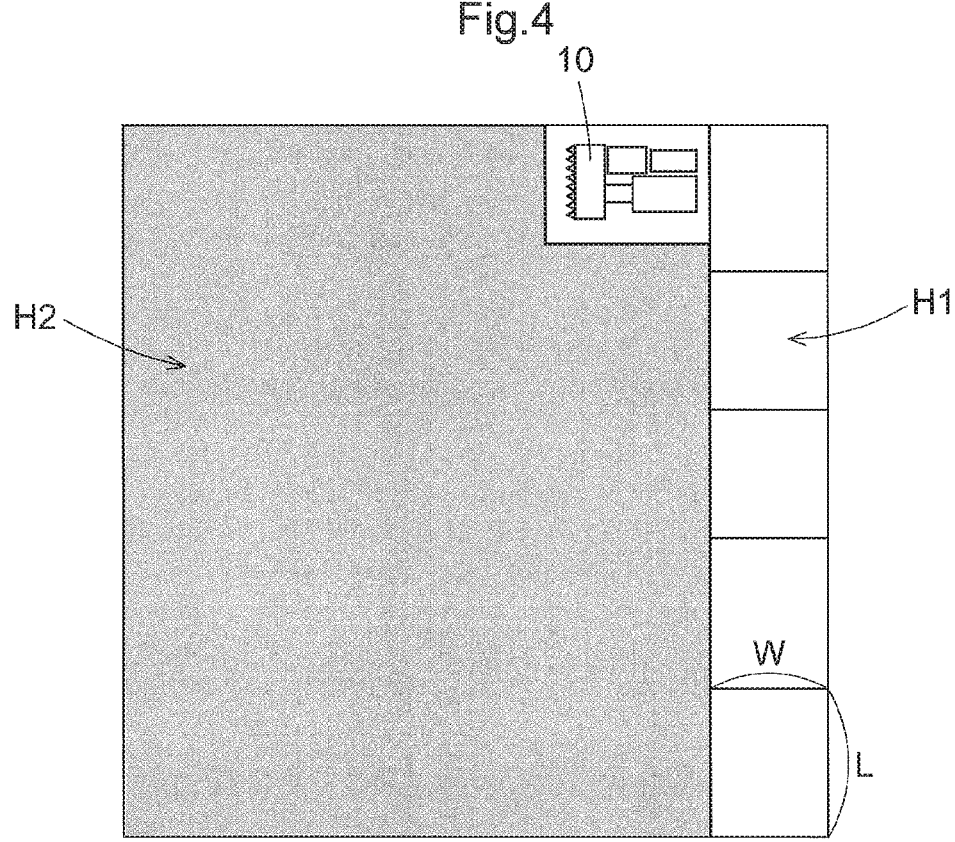
FIG. 4 is a diagram illustrating polygons for crop yields.
Figure 5:
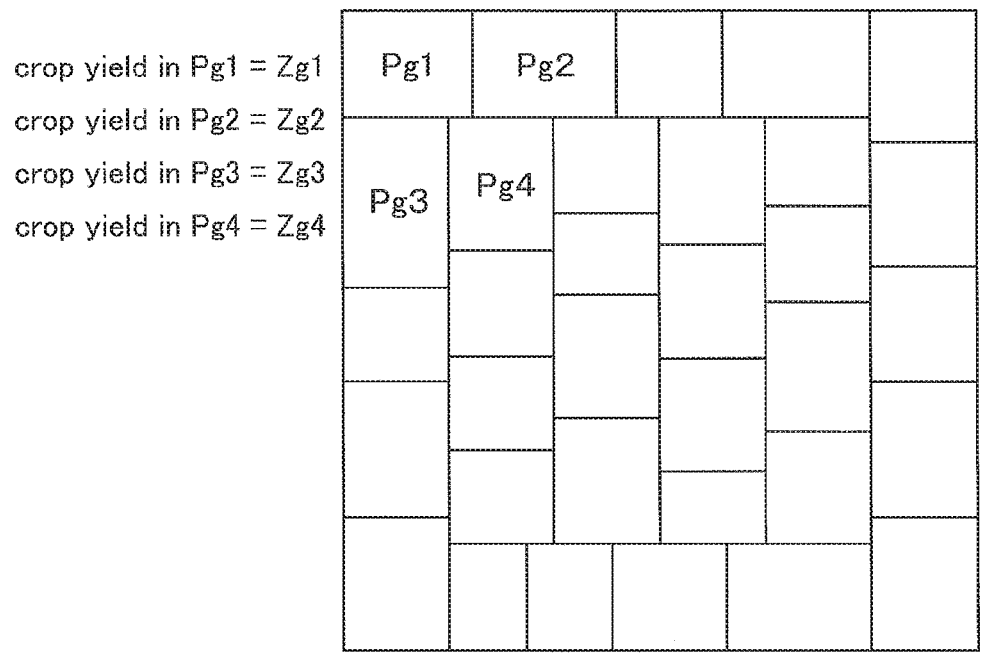
FIG. 5 is a diagram illustrating a crop yield polygon map.

More specifically, the crop yield polygons are rectangles, as illustrated in FIG. 4 and FIG. 5. A width W of each polygon is the same as the work width of the combine 10. A length L of each polygon is calculated as the product of the speed of the combine 10 and an obtainment time interval of the crop yield.

The per-surface area unit crop yield polygon constructing unit 24 constructs a per-surface area unit crop yield polygon each time the crop yield, which is obtained by the crop yield measuring unit 15, is obtained. For example, if the crop yield has been obtained five times as the combine 10 travels, the per-surface area unit crop yield polygon constructing unit 24 constructs five polygons for the per-surface area unit crop yield. At this time, the per-surface area unit crop yield polygon constructing unit 24 constructs the per-surface area unit crop yield polygons on the basis of the work width of the combine 10 and the speed of the combine 10.

To be more specific, the per-surface area unit crop yield polygon is a rectangle, like the crop yield polygon. A width W of each polygon is the same as the work width of the combine 10. A length L of each polygon is calculated as the product of the speed of the combine 10 and an obtainment time interval of the crop yield.

The protein polygon constructing unit 27 constructs a protein polygon each time the protein content of the crop, which is obtained by the protein measuring unit 16, is measured. For example, if the protein content of the crop has been obtained five times as the combine 10 travels, the protein polygon constructing unit 27 constructs five protein polygons. At this time, the protein polygon constructing unit 27 constructs the protein polygons for crop yield on the basis of the work width of the combine 10 and the speed of the combine 10.

To be more specific, the protein polygon is a rectangle, like the crop yield polygon. A width W of each polygon is the same as the work width of the combine 10. A length L of each polygon is calculated as the product of the speed of the combine 10 and an obtainment time interval of the protein content of the crop.

Thus the field map generating system A includes the crop yield polygon constructing unit 21, the per-surface area unit crop yield polygon constructing unit 24, and the protein polygon constructing unit 27, which construct polygons on the basis of the work width and speed of the combine 10 each time the crop data is obtained by the crop data obtaining unit 14.

The position information obtained by the position information obtaining unit 17 is sent to the position information assigning unit 30.

As described above, the position information indicates the position where the crop is harvested in the field. The position information assigning unit 30 assigns the position information obtained from the position information obtaining unit 17 to the crop yield polygons, the per-surface area unit crop yield polygons, and the protein polygons.

Thus the field map generating system A includes the position information assigning unit 30, which assigns the position information to each of the polygons constructed by the crop yield polygon constructing unit 21, the per-surface area unit crop yield polygon constructing unit 24, and the protein polygon constructing unit 27.

Using the configuration described above, crop yield polygons are constructed in sequence so as to correspond to the crop yields at each of positions in an already-reaped site H1, as illustrated in FIG. 4 and FIG. 5. The already-reaped site H1 is a part of the field where the combine 10 has traveled for the harvesting work. The per-surface area unit crop yield polygons and protein polygons are constructed in sequence in the same manner.

The "polygons" mentioned in this specification are not actually formed on the field, but rather are virtual polygons constructed so as to correspond to each piece of crop data at each of harvesting positions in the field. FIG. 4 illustrates the crop yield polygons as being constructed in sequence as the combine 10 travels for harvesting work.

The present invention is not limited thereto, however. Rather than constructing the various types of polygons in sequence as the combine 10 travels for harvesting work, the field map generating system A may be configured such that the polygons are constructed after the combine 10 has finished traveling for harvesting work.

In FIG. 4, the part not yet traveled for harvesting work is indicated as an unreaped site H2.

The crop yield obtained by the crop yield measuring unit 15 is sent to the crop yield data assigning unit 22 and the per-surface area unit crop yield data assigning unit 25. The crop protein content obtained by the protein measuring unit 16 is sent to the protein data assigning unit 28.

The crop yield data assigning unit 22 assigns the crop yield obtained from the crop yield measuring unit 15 to the crop yield polygons, which have been constructed by the crop yield polygon constructing unit 21.

To describe this assignment in detail, the crop yields obtained by the crop yield measuring unit 15 are given numbers based on the order in which they were obtained. Likewise, the crop yield polygons, which have been constructed by the crop yield polygon constructing unit 21, are given numbers based on the order in which they were constructed. The crop yield which has been given the same number as a crop yield polygon is assigned to that polygon.

The per-surface area unit crop yield data assigning unit 25 calculates a per-surface area unit crop yield (corresponding to "crop information" according to the present invention) from the crop yield obtained from the crop yield measuring unit 15. The per-surface area unit crop yield data assigning unit 25 then assigns the per-surface area unit crop yield to the per-surface area unit crop yield polygons constructed by the per-surface area unit crop yield polygon constructing unit 24.

The per-surface area unit crop yield is calculated by dividing the crop yield by the field surface area corresponding to the per-surface area unit crop yield polygon to which that per-surface area unit crop yield is to be assigned.

To describe this assignment in detail, the per-surface area unit crop yields calculated by the per-surface area unit crop yield data assigning unit 25 are given numbers, like the crop yields. Likewise, the per-surface area unit crop yield polygons, which have been constructed by the per-surface area unit crop yield polygon constructing unit 24, are given numbers based on the order in which they were constructed. The per-surface area unit crop yield which has been given the same number as a per-surface area unit crop yield polygon is assigned to that polygon.

The protein data assigning unit 28 assigns the crop protein contents obtained from the protein measuring unit 16 to the protein polygons constructed by the protein polygon constructing unit 27.

To describe this assignment in detail, the crop protein contents obtained by the protein measuring unit 16 are given numbers based on the order in which they were obtained. Likewise, the protein polygons, which have been constructed by the protein polygon constructing unit 27, are given numbers based on the order in which they were constructed. The crop protein content which has been given the same number as a protein polygon is assigned to that polygon.

Thus the field map generating system A includes the crop yield data assigning unit 22, the per-surface area unit crop yield data assigning unit 25, and the protein data assigning unit 28, which assign crop data or crop information based on the crop data to each of the polygons constructed by the crop yield polygon constructing unit 21, the per-surface area unit crop yield polygon constructing unit 24, and the protein polygon constructing unit 27.

The crop yield data assigning unit 22 assigns the crop yield to the polygons as the crop data. The per-surface area unit crop yield data assigning unit 25 assigns the per-surface area unit crop yield, which is calculated by dividing the crop yield obtained by the crop data obtaining unit 14 by the field surface area corresponding to the polygon to which the per-surface area unit crop yield is to be assigned, to the polygons, as the crop information. The protein data assigning unit 28 assigns the crop protein content to the polygons as the crop data.

As illustrated in FIG. 5, the crop yield polygon map generating unit 23 generates a crop yield polygon map (corresponding to a "field polygon map" according to the present invention), which is an aggregate of the crop yield polygons, by aggregating the crop yield polygons. The generated crop yield polygon map is stored in the polygon map storing unit 31.

The operator can view the crop yield polygon map by accessing the management server 2 through the operating terminal 3. As described above, crop yields are assigned to the crop yield polygons. The operator can therefore know the crop yield at each harvesting position in the field by viewing the crop yield polygon map.

Figures 7, 8:
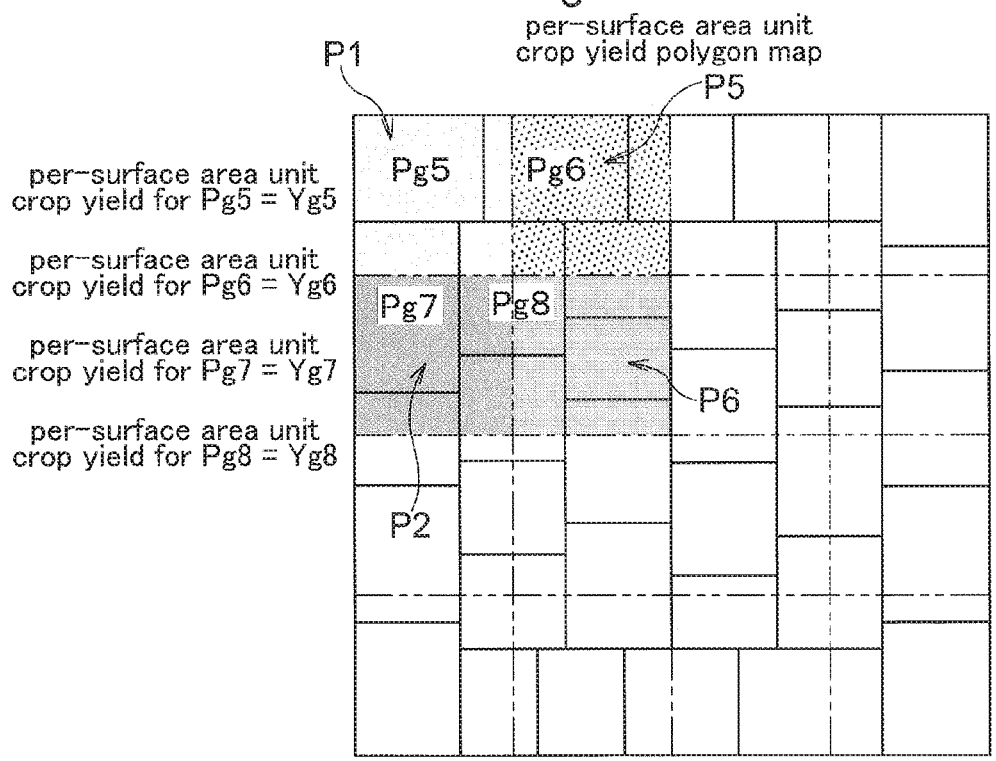
FIG. 7 is a diagram illustrating a post-conversion map based on a crop yield polygon map.
FIG. 8 is a diagram illustrating a per-surface area unit crop yield polygon map.

As illustrated in FIG. 8, the per-surface area unit crop yield polygon map generating unit 26 generates a per-surface area unit crop yield polygon map (corresponding to a "field polygon map" according to the present invention), which is an aggregate of the per-surface area unit crop yield polygons, by aggregating the per-surface area unit crop yield polygons. The generated per-surface area unit crop yield polygon map is stored in the polygon map storing unit 31.

The operator can view the per-surface area unit crop yield polygon map by accessing the management server 2 through the operating terminal 3. As described above, per-surface area unit crop yields are assigned to the per-surface area unit crop yield polygons. The operator can therefore know the per-surface area unit crop yield at each harvesting position in the field by viewing the per-surface area unit crop yield polygon map.

Figures 9, 10:
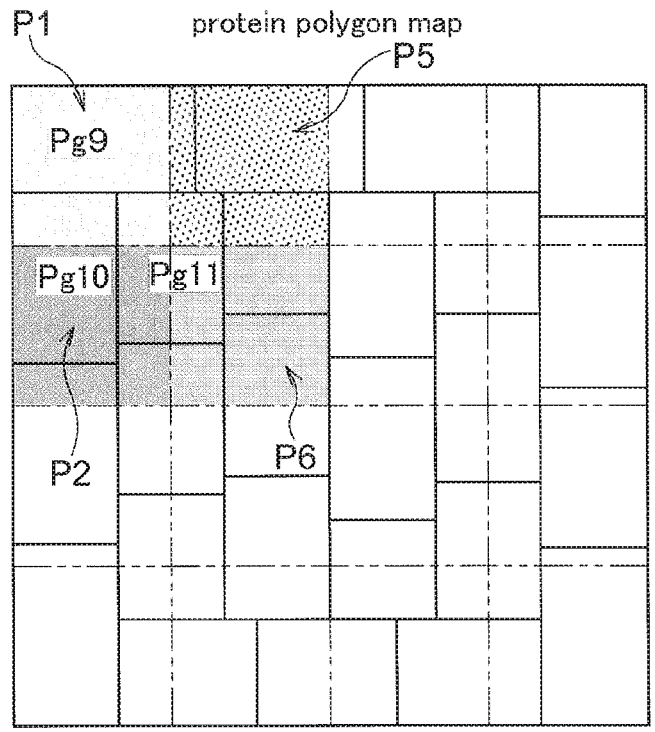
FIG. 9 is a diagram illustrating a post-conversion map based on the per-surface area unit crop yield polygon map.
FIG. 10 is a diagram illustrating a protein polygon map.

As illustrated in FIG. 10, the protein polygon map generating unit 29 generates a protein polygon map (corresponding to a "field polygon map" according to the present invention), which is an aggregate of the protein polygons, by aggregating the protein polygons. The generated protein polygon map is stored in the polygon map storing unit 31.

The operator can view the protein polygon map by accessing the management server 2 through the operating terminal 3. As described above, crop protein contents are assigned to the protein polygons. The operator can therefore know the crop protein content at each harvesting position in the field by viewing the protein polygon map.

Thus the field map generating system A includes the crop yield polygon map generating unit 23 that generates the crop yield polygon map, which is an aggregate of the crop yield polygons, by aggregating the crop yield polygons. Additionally, the field map generating system A includes the per-surface area unit crop yield polygon map generating unit 26 that generates the per-surface area unit crop yield polygon map, which is an aggregate of the per-surface area unit crop yield polygons, by aggregating the per-surface area unit crop yield polygons. Furthermore, the field map generating system A includes the protein polygon map generating unit 29 that generates the protein polygon map, which is an aggregate of the protein polygons, by aggregating the protein polygons.

Furthermore, as described here, the crop yield polygon map generating unit 23 and the protein polygon map generating unit 29 generate the crop yield polygon map and the protein polygon map for each type of crop data.

As illustrated from FIG. 5 to FIG. 11, the map converting unit 32 converts the crop yield polygon map, the per-surface area unit crop yield polygon map, and the protein polygon map, which are stored in the polygon map storing unit 31, into post-conversion maps that are segmented into a plurality of index segments different from the polygons. The index segments are segments that can be set as desired, and are set so that an administrator can manage the crop data as appropriate. For example, the index segments can be made to correspond to the minute segments found in conventional field maps.

Thus the field map generating system A includes the map converting unit 32, which converts the crop yield polygon map, the per-surface area unit crop yield polygon map, and the protein polygon map into post-conversion maps, which are segmented into a plurality of index segments different from the polygons.

As illustrated in FIG. 6 to FIG. 11, in the present embodiment, the map converting unit 32 segments each of the crop yield polygon map, the per-surface area unit crop yield polygon map, and the protein polygon map into the plurality of index segments using the same way of segmenting. However, the present invention is not limited thereto, and the map converting unit 32 may segment the crop yield polygon map, the per-surface area unit crop yield polygon map, and the protein polygon map into a plurality of index segments through mutually-different ways of segmenting so that the respective data can be managed appropriately.

The following will describe the conversion of the crop yield polygon map, the per-surface area unit crop yield polygon map, and the protein polygon map in detail.

Crop Yield Polygon Map Conversion

Figure 6:
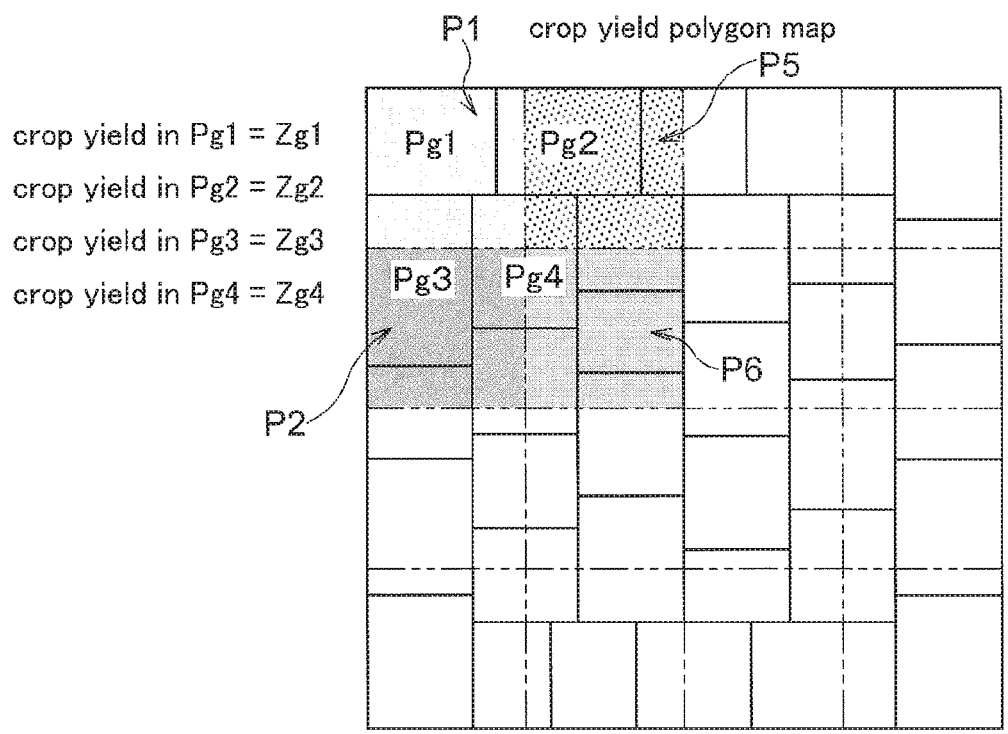
FIG. 6 is a diagram illustrating a crop yield polygon map.

As illustrated in FIG. 5 to FIG. 7, the map converting unit 32 converts the crop yield polygon map into a post-conversion map which is segmented into a plurality of index segments P1 to P16. Specifically, the map converting unit 32 converts the segments in the crop yield polygon map (the polygons) into index segments segmented in a different way. As such, each index segment is a segment in which a part or all of one or more polygons are arranged in overlapping positions. The map converting unit 32 also converts the crop yields assigned on a polygon-by-polygon basis in the crop yield polygon map into crop yields assigned on an index segment-by-index segment basis in the post-conversion map. At this time, the map converting unit 32 calculates the crop yield to be assigned to each index segment by adding together surface area-appropriated crop yields of the parts of each polygon which overlap with the index segments (surface area-appropriated crop yields of the parts present in the index segments).

To describe in more detail, the surface area-appropriated crop yield of a part in a single polygon present in a single index segment is the product of the crop yield assigned to the polygon, and the ratio of the field surface area corresponding to each part in the polygon where the index segment is present to the field surface area corresponding to the entire polygon.

Then, for each polygon overlapping with a single index segment, the map converting unit 32 calculates the surface area-appropriated crop yield of each part where that index segment is present, and then adds the surface area-appropriated crop yields together to calculate the crop yield in that index segment.

For example, as illustrated in FIG. 5 to FIG. 7, the index segment P1 overlaps with polygons Pg1 to Pg4. Zg1 represents the crop yield assigned to the polygon Pg1, Zg2 represents the crop yield assigned to the polygon Pg2, Zg3 represents the crop yield assigned to the polygon Pg3, and Zg4 represents the crop yield assigned to the polygon Pg4.

Here, the entire polygon Pg1 is present in the index segment P1. As such, the ratio of the field surface area corresponding to the part of the polygon Pg1 present in the index segment P1, to the field surface area corresponding to the entire polygon Pg1, is 1.

In this case, the surface area-appropriated crop yield of the part of the polygon Pg1 present in the index segment P1 is calculated as the product of that ratio (=1) and Zg1.

Part of the polygon Pg2 is also present in the index segment P1. The ratio of the field surface area of the part of the polygon Pg2 present in the index segment P1, to the field surface area of the polygon Pg2, is 0.2.

In this case, the surface area-appropriated crop yield of the part of the polygon Pg2 present in the index segment P1 is calculated as the product of that ratio (=0.2) and Zg2.

Additionally, assume that the ratio of the field surface area corresponding to the part of the polygon Pg3 present in the index segment P1, to the field surface area corresponding to the entire polygon Pg3, is 0.4.

In this case, in the polygon Pg3, the surface area-appropriated crop yield of the part present in the index segment P1 is calculated as the product of that ratio (=0.4) and Zg3.

Additionally, assume that the ratio of the field surface area corresponding to the part of the polygon Pg4 present in the index segment P1, to the field surface area corresponding to the entire polygon Pg4, is 0.3.

In this case, in the polygon Pg4, the surface area-appropriated crop yield of the part present in the index segment P1 is calculated as the product of that ratio (=0.3) and Zg4.

Adding these surface area-appropriated crop yields together gives the following:

$$1 \times Zg1 + 0.2 = Zg2 + 0.4 = Zg3 + 0.3 = Zg4$$

This is the crop yield assigned to the index segment P1.

The map converting unit 32 carries out the same type of calculations for the index segments P2 to P16, and assigns a crop yield to each index segment.

Per-surface Area Unit Crop Yield Map Conversion

As illustrated in FIG. 8 and FIG. 9, the map converting unit 32 converts the per-surface area unit crop yield polygon map into a post-conversion map which is segmented into the plurality of index segments P1 to P16. Specifically, the map converting unit 32 converts the segments in the per-surface area unit crop yield polygon map (the polygons) into index segments segmented in a different way. As such, each index segment is a segment in which a part or all of one or more polygons are arranged in overlapping positions. The map converting unit 32 also converts the per-surface area unit crop yields assigned on a polygon-by-polygon basis in the per-surface area unit crop yield polygon map into per-surface area unit crop yields assigned on an index segment-by-index segment basis in the post-conversion map. At this time, the map converting unit 32 calculates the per-surface area unit crop yield to be assigned to each index segment by taking the sum of surface area-appropriated crop yields of the parts of each polygon which overlap with the index segments (surface area-appropriated crop yields of the parts present in the index segments) and dividing that sum by the field surface area corresponding to the index segment to which the per-surface area unit crop yield is to be assigned.

To describe in more detail, as described above, the surface area-appropriated crop yield of a part in a single polygon present in a single index segment is the product of the crop yield assigned to the polygon, and the ratio of the field surface area corresponding to the each part in the polygon where the index segment is present to the field surface area corresponding to the entire polygon.

Additionally, the surface area-appropriated crop yield of a part in a single polygon present in a single index segment is equal to the product of the field surface area corresponding to the part of that polygon present in that index segment, and the per-surface area unit crop yield assigned to that polygon.

For each polygon overlapping with a single index segment, the map converting unit 32 calculates the surface area-appropriated crop yield of each part where that index segment is present, finds the sum of those surface area-appropriated crop yields, and then divides that sum by the field surface area corresponding to the index segment to which the per-surface area unit crop yield is to be assigned, to calculate the per-surface area unit crop yield in that index segment.

For example, as illustrated in FIG. 8 and FIG. 9, the index segment P1 overlaps with polygons Pg5 to Pg8. Yg5 represents the per-surface area unit crop yield assigned to the polygon Pg5, Yg6 represents the crop yield assigned to the polygon Pg6, Yg7 represents the crop yield assigned to the polygon Pg7, and Yg8 represents the crop yield assigned to the polygon Pg8.

Here, assume that in the polygon Pg5, the field surface area corresponding to the part present in the index segment P1 is Sg5.

In this case, in the polygon Pg5, the surface area-appropriated crop yield of the part present in the index segment P1 is calculated as the product of Sg5 and Yg5.

Additionally, assume that in the polygon Pg6, the field surface area corresponding to the part present in the index segment P1 is Sg6.

In this case, in the polygon Pg6, the surface area-appropriated crop yield of the part present in the index segment P1 is calculated as the product of Sg6 and Yg6.

Additionally, assume that in the polygon Pg7, the field surface area corresponding to the part present in the index segment P1 is Sg7.

In this case, in the polygon Pg7, the surface area-appropriated crop yield of the part present in the index segment P1 is calculated as the product of Sg7 and Yg7.

Additionally, assume that in the polygon Pg8, the field surface area corresponding to the part present in the index segment P1 is Sg8.

In this case, in the polygon Pg8, the surface area-appropriated crop yield of the part present in the index segment P1 is calculated as the product of Sg8 and Yg8.

The sum of these surface area-appropriated crop yields is:

$$Sg5 = Yg5 + Sg6 \times Yg6 + Sg7 = Yg7 + Sg8 = Yg8$$

When the field surface area corresponding to the index segment P1 is represented by S1, dividing the sum of the surface area-appropriated crop yields by the field surface area corresponding to the index segment P1 gives the following:

$$(Sg5 \times Yg5 + Sg6 \times Yg6 + Sg7 \times Yg7 + Sg8 \times Yg8)/S1$$

This is the per-surface area unit crop yield assigned to the index segment P1.

The map converting unit 32 carries out the same type of calculations for the index segments P2 to P16, and assigns a per-surface area unit crop yield to each index segment.

Protein Polygon Map Conversion

Figures 11, 12:
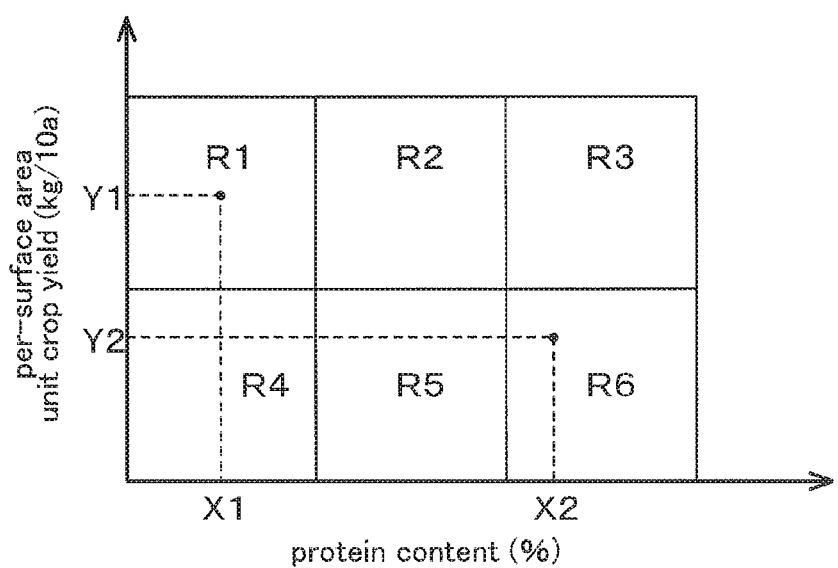
FIG. 11 is a diagram illustrating a post-conversion map based on a protein polygon map.
FIG. 12 is a diagram illustrating a distribution graph.

As illustrated in FIG. 10 and FIG. 11, the map converting unit 32 converts the protein polygon map into a post-conversion map which is segmented into the plurality of index segments P1 to P16. Specifically, the map converting unit 32 converts the segments in the protein polygon map (the polygons) into index segments segmented in a different way. As such, each index segment is a segment in which a part or all of one or more polygons are arranged in overlapping positions. The map converting unit 32 also converts the protein contents assigned on a polygon-by-polygon basis in the protein polygon map into protein contents assigned on an index segment-by-index segment basis in the post-conversion map. In this case, the map converting unit 32 calculates the protein content assigned to each index segment as the mean value of the protein contents assigned to the polygons overlapping with that index segment. When calculating the mean value, the map converting unit 32 carries out weighting using the field surface area corresponding to the part of each polygon overlapping with each index segment.

To describe in more detail, the protein content in a single index segment can be calculated as the mean value of the protein contents assigned to the polygons overlapping with that index segment.

The degree to which the protein content assigned to a single polygon overlapping with that index segment affects the mean value depends on the size of the field surface area corresponding to the part of the index segment present in that polygon.

As such, when calculating the mean value, the map converting unit 32 carries out weighting using the field surface area corresponding to the part of each polygon present in each index segment. This makes it possible to calculate the mean value taking into account the degree to which the protein content assigned to each polygon affects the mean value.

To be more specific, when calculating the protein content to be assigned to a single index segment, the map converting unit 32 first calculates, for each polygon overlapping with that index segment, the product of the field surface area corresponding to the part of the polygon present in the index segment and the protein content assigned to that polygon. The calculated products are then added together, and the sum is divided by the field surface area corresponding to that index segment.

Weighting using the field surface area is thus carried out when calculating the mean value of the protein contents.

For example, as illustrated in FIG. 10 and FIG. 11, the index segment P1 overlaps with polygons Pg9 to Pg11. Xg9 represents the protein content assigned to the polygon Pg9, Xg10 represents the protein content assigned to the polygon Pg10, and Xg11 represents the protein content assigned to the polygon Pg11.

Here, assume that in the polygon Pg9, the field surface area corresponding to the part present in the index segment P1 is Sg9.

In this case, the product of the field surface area corresponding to the part of the polygon Pg9 present in the index segment P1 and the protein content assigned to the polygon Pg9 is calculated as the product of Sg9 and Xg9.

Additionally, assume that in the polygon Pg10, the field surface area corresponding to the part present in the index segment P1 is Sg10.

In this case, the product of the field surface area corresponding to the part of the polygon Pg10 present in the index segment P1 and the protein content assigned to the polygon Pg10 is calculated as the product of Sg10 and Xg10.

Additionally, assume that in the polygon Pg11, the field surface area corresponding to the part present in the index segment P1 is Sg11.

In this case, the product of the field surface area corresponding to the part of the polygon Pg11 present in the index segment P1 and the protein content assigned to the polygon Pg11 is calculated as the product of Sg11 and Xg11.

The sum of these products is:

$$Sg9 \times Xg9 + Sg10 \times Xg10 + Sg11 \times Xg11$$

When the field surface area corresponding to the index segment P1 is represented by S1, dividing the sum of these products by the field surface area corresponding to the index segment P1 gives the following:

$$(Sg9 \times Xg9 + Sg10 \times Xg10 + Sg11 \times Xg11)/S1$$

This is the protein content to be assigned to the index segment P1.

The map converting unit 32 carries out the same type of calculations for the index segments P2 to P16, and assigns a protein content to each index segment.

Determining the Fertilizer Level

As described above, in the present embodiment, the map converting unit 32 segments each of the crop yield polygon map, the per-surface area unit crop yield polygon map, and the protein polygon map into the plurality of index segments using the same way of segmenting.

Here, the map converting unit 32 determines the size of the index segments in accordance with the work width of the rice transplanter 5, which is a different work vehicle 1 from the combine 10. To be more specific, in the present embodiment, the width of the index segments is set to match the work width of the rice transplanter 5.

Thus the map converting unit 32 determines the size of the index segments in accordance with the work width of a different work vehicle 1 from the combine 10.

The distribution graph illustrated in FIG. 12 and the fertilizer level table illustrated in FIG. 13 are stored in the fertilizer level determining unit 33. The fertilizer level determining unit 33 determines a fertilizer level for each index segment after the harvesting work on the basis of the distribution graph and the fertilizer level table.

To describe in more detail, in the distribution graph, the horizontal axis represents the protein content and the vertical axis represents the per-surface area unit crop yield, as illustrated in FIG. 12. The distribution graph is divided into sections R1 to R6. A point corresponding to each index segment is plotted in the distribution graph on the basis of the protein content and the per-surface area unit crop yield in each index segment. As a result, each index segment is assigned to one of the sections R1 to R6.

As illustrated in FIG. 13, the sections R1 to R6 are associated with fertilizer levels m1 to m6 in the fertilizer level table. The fertilizer level for each index segment is determined on the basis of the section to which the index segment is assigned in the distribution graph, and the fertilizer level table.

For example, as illustrated in FIG. 9 and FIG. 11, Y1 represents the per-surface area unit crop yield in the index segment P1. X1 represents the protein content in the index segment P1.

As illustrated in FIG. 12, in the distribution graph, the point where the protein content is X1 and the per-surface area unit crop yield is Y1 belongs to the section R1. The index segment P1 is therefore assigned to the section R1. The fertilizer level associated with the section R1 is m1, as illustrated in FIG. 13.

In other words, the fertilizer level determining unit 33 determines m1 to be the fertilizer level for the index segment P1.

Additionally, as illustrated in FIG. 9 and FIG. 11, Y2 represents the per-surface area unit crop yield in the index segment P2. X2 represents the protein content in the index segment P2.

As illustrated in FIG. 12, in the distribution graph, the point where the protein content is X2 and the per-surface area unit crop yield is Y2 belongs to the section R6. The index segment P2 is therefore assigned to the section R6. The fertilizer level associated with the section R6 is m6, as illustrated in FIG. 13.

In other words, the fertilizer level determining unit 33 determines m6 to be the fertilizer level for the index segment P2.

The fertilizer level determining unit 33 carries out the same type of calculations for the index segments P3 to P16, and determines a fertilizer level for each index segment.

The fertilizer levels for the index segments, determined by the fertilizer level determining unit 33, are sent to the rice transplanter 5. The rice transplanter 5 controls a fertilizing device on the basis of the fertilizer levels for the index segments which have been received.

The operator can view the fertilizer levels for the index segments, which have been determined by the fertilizer level determining unit 33, by accessing the management server 2 through the operating terminal 3.

According to the configuration described thus far, the crop yield polygon constructing unit 21, the per-surface area unit crop yield polygon constructing unit 24, and the protein polygon constructing unit 27 construct polygons for each piece of crop data, rather than the crop data being obtained in accordance with a method for segmenting the field which has been determined in advance. It is therefore not necessary to obtain the crop data at equal distance intervals, which makes it possible to avoid a situation in which the accuracy of the crop data drops due to the crop data being obtained at equal distance intervals.

Furthermore, because the crop yield polygon constructing unit 21, the per-surface area unit crop yield polygon constructing unit 24, and the protein polygon constructing unit 27 construct the polygons for each piece of crop data instead of the field being segmented in advance, a situation where the positions where the crop data is obtained do not fit with the way in which the field is segmented can be avoided. This makes it possible to generate a field map that corresponds to the actual situation.

Thus by using the configuration described thus far, a situation in which the accuracy of the crop data or the crop information based on the crop data drops can be avoided, and a field map that corresponds to the actual situation can be generated as well.

Variations on First Embodiment (1) The crop data obtaining unit 14 may include a moisture value measuring unit that obtains a moisture value of the crop. The moisture value of the crop corresponds to a "quality value" according to the present invention. In this case, the configuration can be such that a moisture value polygon constructing unit, a moisture value data assigning unit, and a moisture value polygon map generating unit are included, and a moisture value polygon map is generated.

(2) The configuration may be such that the flavor of the crop is calculated on the basis of the crop protein content, moisture value, and so on. In this case, the configuration can be such that a flavor polygon constructing unit, a flavor data assigning unit, and a flavor polygon map generating unit are included, and a flavor polygon map is generated.

(3) The crop yield measuring unit 15 may be configured to measure the crop yield every predetermined period aside from one second, and may be configured to measure the crop yield at irregular intervals. The crop yield may also be measured each time a set measurement condition is met.

(4) The protein measuring unit 16 may be configured to measure the crop protein content every predetermined period aside from two seconds, and may be configured to measure the crop protein content at irregular intervals.

(5) The number of index segments in the post-conversion map may be 15 or lower, or 17 or higher.

(6) The map converting unit 32 may be configured to determine the size of the index segment in accordance with a size set by the operator through the operating terminal 3.

(7) The map converting unit 32 may be configured so that when calculating the mean value of the protein contents, weighting is not carried out using the field surface area corresponding to the parts of the polygon included in the index segments.

(8) The map converting unit 32 may be omitted.

(9) The per-surface area unit crop yield polygon constructing unit 24 may be omitted.

(10) The per-surface area unit crop yield data assigning unit 25 may be omitted.

(11) The per-surface area unit crop yield polygon map generating unit 26 may be omitted.

(12) The crop data obtaining unit 14 may be configured to obtain only one type of crop data over time.

(13) The working state determining unit 11 may be omitted.

(14) The work width calculating unit 12 may be omitted.

(15) Some or all of the crop yield polygon constructing unit 21, the crop yield data assigning unit 22, the crop yield polygon map generating unit 23, the per-surface area unit crop yield polygon constructing unit 24, the per-surface area unit crop yield data assigning unit 25, the per-surface area unit crop yield polygon map generating unit 26, the protein polygon constructing unit 27, the protein data assigning unit 28, the protein polygon map generating unit 29, the position information assigning unit 30, the polygon map storing unit 31, the map converting unit 32, and the fertilizer level determining unit 33 may be provided in the combine 10.

(16) The polygons can be constructed using any desired configuration or method, regardless of the crop yield polygon constructing unit 21, the per-surface area unit crop yield polygon constructing unit 24, and the protein polygon constructing unit 27. The polygon map can be generated using any desired configuration or method, regardless of the crop yield polygon map generating unit 23, the per-surface area unit crop yield polygon map generating unit 26, and the protein polygon map generating unit 29. The polygon map conversion can be carried out using any desired configuration or method, regardless of the map converting unit 32. Furthermore, these methods can be realized by programs. In this case, the programs are stored in a storage device 34, and the programs are executed by a CPU 35, as illustrated in FIG. 2. Note that the storage device 34 and the CPU 35 can be provided in any desired location, e.g., the management server 2 or the operating terminal 3.

Second Embodiment

An embodiment for carrying out the present invention will be described on the basis of the drawings.

Overall Configuration of Field Map Generating System

Figure 14:
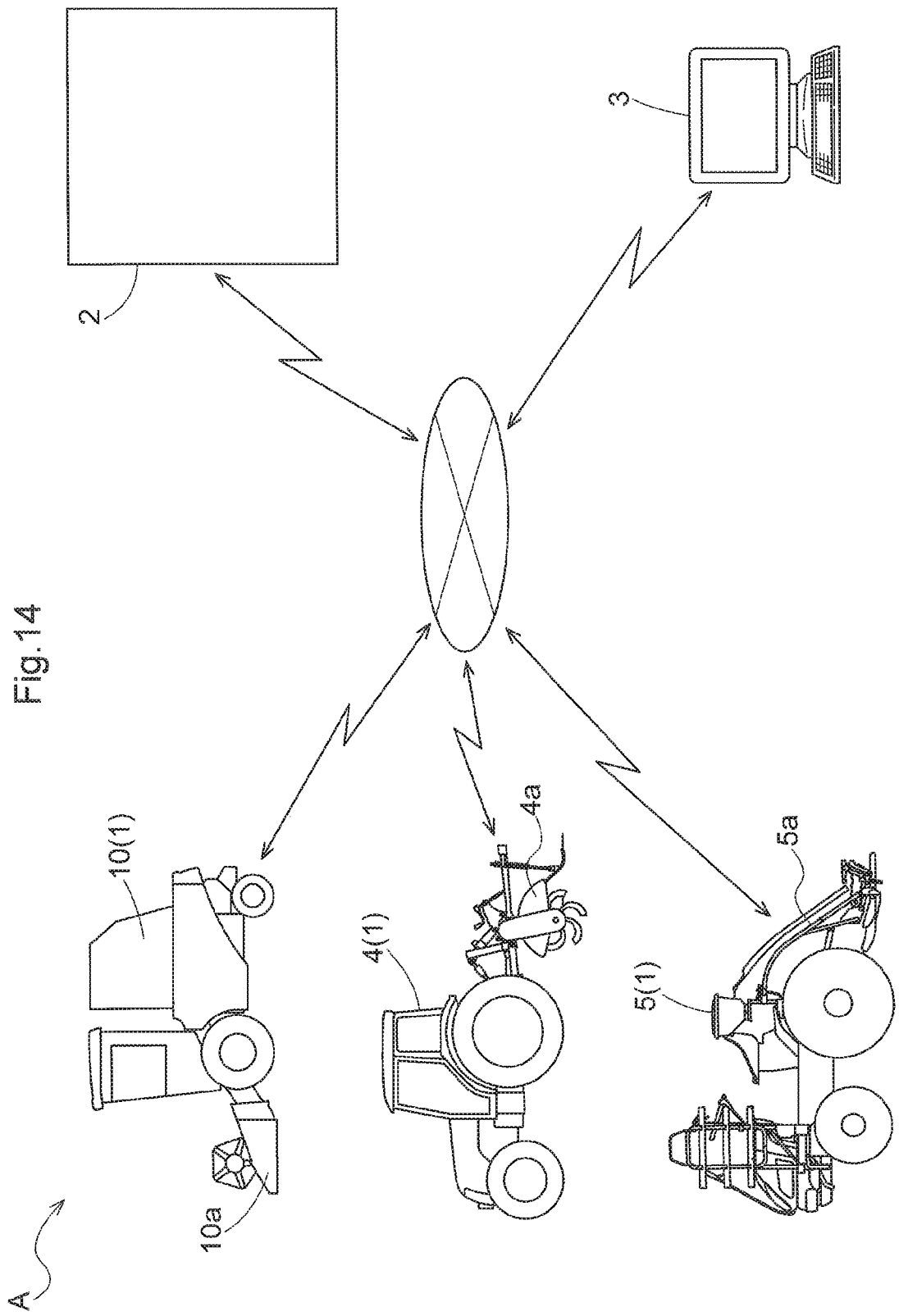
FIG. 14 is an overall view of a field map generating system.

As illustrated in FIG. 14, the field map generating system A includes various types of work vehicles 1, such as agricultural vehicles or the like, and the management server 2. The various work vehicles 1 and the management server 2 are configured to be capable of communicating with each other. The operating terminal 3, which is operated by an operator, is also configured to be capable of communicating with the management server 2. The operating terminal 3 is constituted by a personal computer installed in a farm or the like, for example.

As illustrated in FIG. 14, the various work vehicles 1 include the combine 10, the tractor 4, and the rice transplanter 5. The combine 10, the tractor 4, and the rice transplanter 5 all correspond to "work vehicles" according to the present invention.

The combine 10 includes the reaping unit 10a (corresponding to a "work device" according to the present invention).

The combine 10 carries out harvesting work using the reaping unit 10a while traveling in the field.

The tractor 4 includes a tilling unit 4a (corresponding to a "work device" according to the present invention). The tractor 4 carries out tilling work using the tilling unit 4a while traveling in the field.

The rice transplanter 5 includes a planting unit 5a (corresponding to a "work device" according to the present invention). The rice transplanter 5 carries out seedling planting work using the planting unit 5a while traveling in the field.

Configuration of Combine

Figure 15:
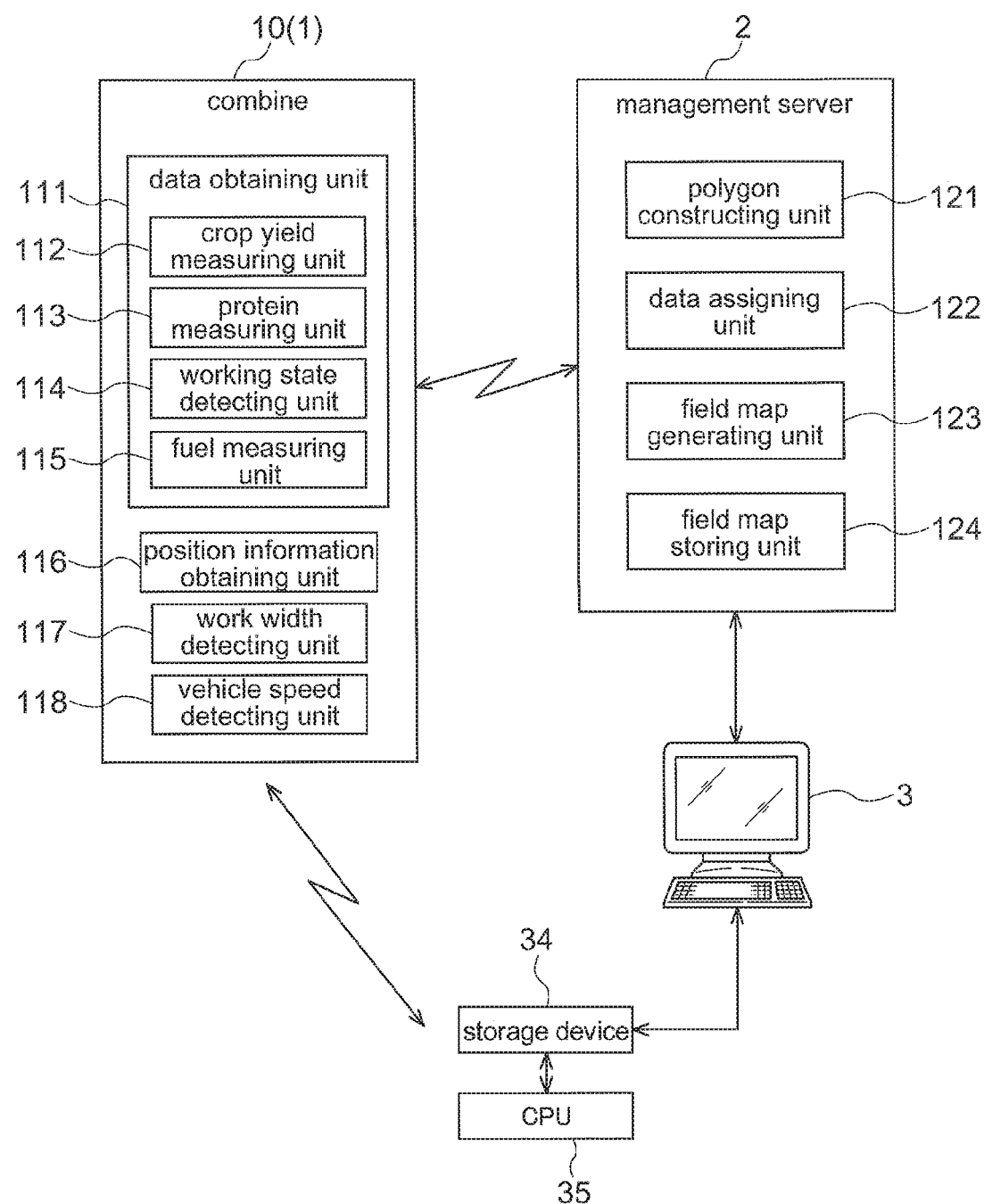
FIG. 15 is a block diagram illustrating the configuration of the field map generating system.

FIG. 15 illustrates the combine 10 as one example of the various work vehicles 1. As illustrated in FIG. 15, the combine 10 includes a data obtaining unit 111, a position information obtaining unit 116, a work width detecting unit 117, and a vehicle speed detecting unit 118. The data obtaining unit 111 includes a crop yield measuring unit 112, a protein measuring unit 113, a working state detecting unit 114, and a fuel measuring unit 115.

The crop yield measuring unit 112 measures the yield of the crops harvested by the combine 10 (corresponding to "crop information" according to the present invention) over time. Through this, the crop yield measuring unit 112 obtains, as obtained data, the yield of the crops harvested by the combine 10 over time.

The protein measuring unit 113 measures the protein content of the crops harvested by the combine 10 (corresponding to "crop information" according to the present invention) over time. Through this, the protein measuring unit 113 obtains, as obtained data, the protein content of the crops harvested by the combine 10 over time.

The working state detecting unit 114 detects whether the reaping unit 10a is in a working state or a non-working state. Through this, the working state detecting unit 114 obtains, as obtained data, working information (corresponding to "operation information" according to the present invention) indicating whether the reaping unit 10a is in a working state or a non-working state.

To describe in more detail, the combine 10 includes a working clutch (not shown). The working clutch is configured to engage/disengage the transmission of power from an engine (not shown) to the reaping unit 10a.

The combine 10 also includes a grain sensor (not shown). The grain sensor is installed in a front end part of the reaping unit 10a. The grain sensor detects whether or not grain is present.

The combine 10 also includes a reaping unit height sensor (not shown). The reaping unit height sensor detects the height of the reaping unit 10a from the field surface.

The working state detecting unit 114 detects whether the reaping unit 10a is in a working state or a non-working state on the basis of the engagement state of the working clutch, the detection result from the grain sensor, and the detection result from the reaping unit height sensor.

The working state detecting unit 114 detects that the reaping unit 10a is in a working state when the working clutch is engaged, the presence of grain is detected by the grain sensor, and the height of the reaping unit 10a from the field surface is less than or equal to a set height. However, when such is not the case, the working state detecting unit 114 detects that the reaping unit 10a is in a non-working state.

The fuel measuring unit 115 measures the fuel consumption amount and fuel economy of the combine 10 over time. Here, "fuel economy" refers to the distance traveled per unit of the amount of fuel consumed. Both the fuel consumption amount and the fuel economy correspond to "operation information" according to the present invention. Through this, the fuel measuring unit 115 obtains, as obtained data, the fuel consumption amount and fuel economy of the combine 10 over time.

Note that the data obtaining unit 111 may include a field information obtaining unit that obtains the soil moisture level and fertility level of the field, as obtained data, over time. Both the soil moisture level and the fertility level of the field correspond to "field information" according to the present invention.

Thus in the field map generating system A, the combine 10, which uses the reaping unit 10a to carry out agricultural work while traveling in the field, includes the data obtaining unit 111, which obtains, as obtained data, at least one of the following types of information: the operation information, which is information pertaining to the operation of the machine; the field information, which is information pertaining to the field; and the crop information, which is information pertaining to the crop.

Additionally, as described here, the obtained data which is obtained by the data obtaining unit 111 includes, as operation information, the working information indicating whether the reaping unit 10a is in a working state or a non-working state.

The obtained data which has been obtained by the data obtaining unit 111 is sent to the management server 2 along with information indicating the timing at which the obtained data was obtained.

The position information obtaining unit 116 is configured to be capable of obtaining data obtainment position information. Here, the data obtainment position information is the position information of the combine 10 at the time when the obtained data is obtained by the data obtaining unit 111. The position information obtaining unit 116 is constituted by a GPS, for example.

Thus the field map generating system A includes the position information obtaining unit 116 that is capable of obtaining the data obtainment position information, which is position information of the combine 10 at the time when the obtained data is obtained by the data obtaining unit 111.

The work width detecting unit 117 detects the work width of the reaping unit 10a.

To describe in more detail, when the combine 10 travels the field for harvesting work, there are situations where only part of the reaping unit 10a carries out reaping work. In other words, the left-right width of the reaping unit 10a is not necessarily the same as the work width. Accordingly, the work width detecting unit 117 detects the work width of the reaping unit 10a by detecting the part of the reaping unit 10a which is actually carrying out reaping work.

The vehicle speed detecting unit 118 is configured to detect the speed of the combine 10.

Thus the field map generating system A includes the vehicle speed detecting unit 118, which detects the speed of the combine 10.

Configuration of Management Server

The management server 2 includes a polygon constructing unit 121, a data assigning unit 122, a field map generating unit 123, and a field map storing unit 124.

The data obtainment position information obtained by the position information obtaining unit 116 is sent to the polygon constructing unit 121. The work width of the reaping unit 10a detected by the work width detecting unit 117 is also sent to the polygon constructing unit 121. The speed of the combine 10 detected by the vehicle speed detecting unit 118 is also sent to the polygon constructing unit 121.

The polygon constructing unit 121 constructs a polygon on the basis of the data obtainment position information, the work width of the reaping unit 10a, the timing at which the obtained data is obtained by the data obtaining unit 111, and the speed of the combine 10.

Figure 16:
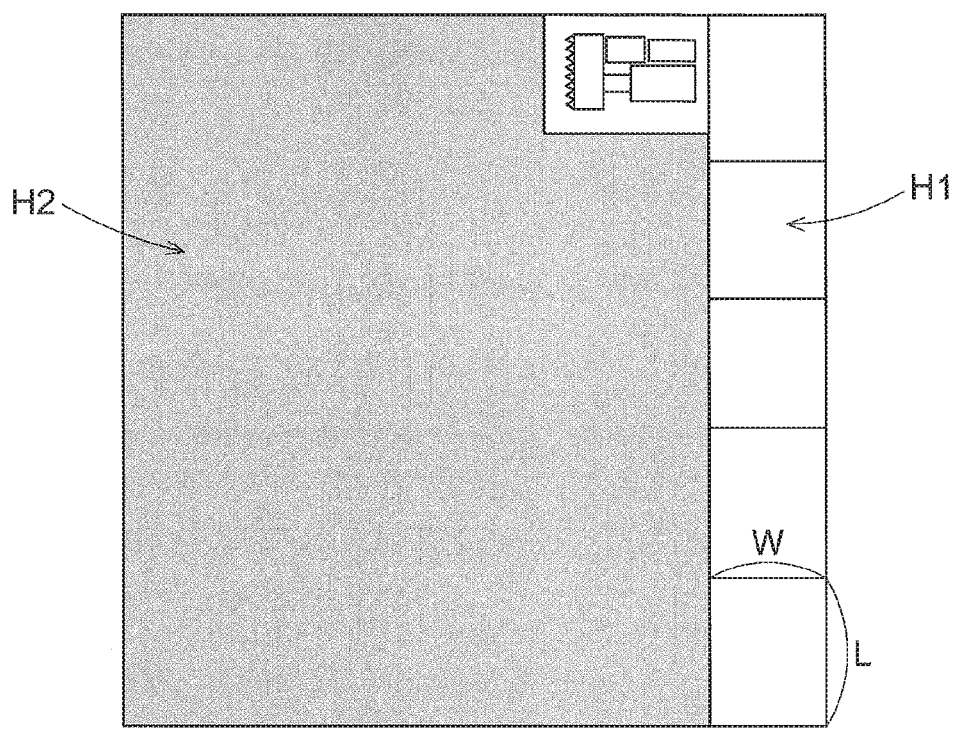
FIG. 16 is a diagram illustrating polygons.
Figure 17:
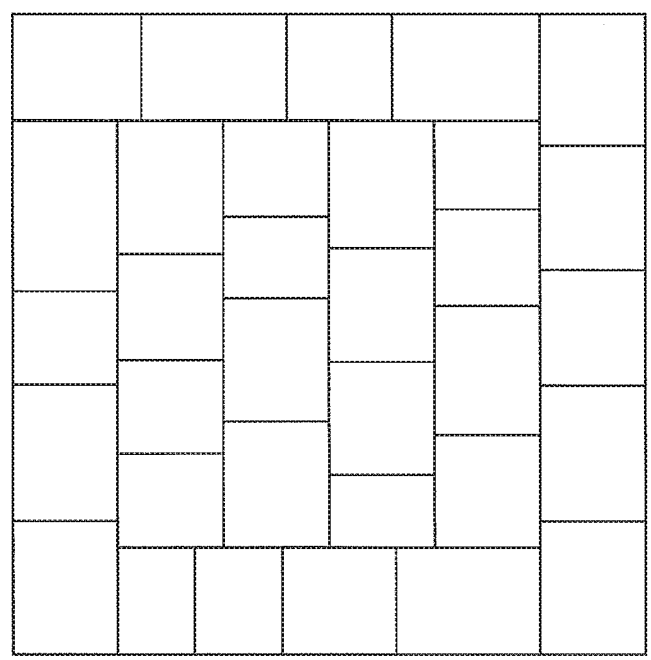
FIG. 17 is a diagram illustrating a field polygon map.

More specifically, the polygons are rectangles, as illustrated in FIG. 16 and FIG. 17. A width W of each polygon is the same as the work width of the reaping unit 10a. A length L of each polygon is calculated as the product of the speed of the combine 10 and an obtainment time interval of the obtained data. Note that the obtainment time interval of the obtained data is calculated on the basis of the timing at which the obtained data is obtained by the data obtaining unit 111.

Additionally, as illustrated in FIG. 16 and FIG. 17, the polygons are constructed on the basis of the data obtainment position information, so as to correspond to each of positions in the field. As described above, the data obtainment position information is the position information of the combine 10 at the time when the obtained data is obtained by the data obtaining unit 111. In other words, a polygon is constructed for each piece of obtained data. For example, if the obtained data has been obtained five times as the combine 10 travels, the polygon constructing unit 121 constructs five polygons.

Thus the field map generating system A includes the polygon constructing unit 121, which constructs a polygon on the basis of the data obtainment position information, the work width of the reaping unit 10a, and the timing at which the obtained data is obtained by the data obtaining unit 111.

Using the configuration described above, polygons are constructed in sequence so as to correspond to each of positions in the already-reaped site H1, as illustrated in FIG. 16 and FIG. 17. The already-reaped site H1 is a part of the field where the combine 10 has traveled for the harvesting work.

The "polygons" mentioned in this specification are not actually formed on the field, but rather are virtual polygons constructed so as to correspond to each of positions in the field. FIG. 16 illustrates the polygons as being constructed in sequence as the combine 10 travels for harvesting work.

The present invention is not limited thereto, however. Rather than constructing the polygons in sequence as the combine 10 travels for harvesting work, the field map generating system A may be configured such that the polygons are constructed after the combine 10 has finished traveling for harvesting work.

In FIG. 16, the part not yet traveled for harvesting work is indicated as an unreaped site H2.

The crop yield obtained by the crop yield measuring unit 112 is sent to the data assigning unit 122. The crop protein content obtained by the protein measuring unit 113 is also sent to the data assigning unit 122. The working information obtained by the working state detecting unit 114 is also sent to the data assigning unit 122. The fuel consumption amount and fuel economy of the combine 10 obtained by the fuel measuring unit 115 is also sent to the data assigning unit 122.

The data assigning unit 122 assigns each piece of obtained data received from the data obtaining unit 111 to the corresponding polygons constructed by the polygon constructing unit 121. Each piece of obtained data includes the crop yield obtained by the crop yield measuring unit 112, the crop protein content obtained by the protein measuring unit 113, the working information obtained by the working state detecting unit 114, and the fuel consumption amount and fuel economy of the combine 10 obtained by the fuel measuring unit 115.

To describe this assignment in detail, the obtained data obtained by the data obtaining unit 111 is given a number based on the order in which that data was obtained. Likewise, the polygons, which have been constructed by the polygon constructing unit 121, are given numbers based on the order in which they were constructed. The obtained data which has been given the same number as a polygon is assigned to that polygon.

Thus the field map generating system A includes the data assigning unit 122, which assigns the obtained data to a corresponding polygon constructed by the polygon constructing unit 121.

As illustrated in FIG. 17, the field map generating unit 123 generates a field polygon map, which is an aggregate of the polygons, by aggregating the polygons. The generated field polygon map is stored in the field map storing unit 124.

Thus the field map generating system A includes the field map generating unit 123 that generates the field polygon map, which is an aggregate of the polygons, by aggregating the polygons.

The operator can view the field polygon map by accessing the management server 2 through the operating terminal 3. As described above, the obtained data is assigned to the polygons. The operator can therefore know the distribution of the obtained data in the field by viewing the field polygon map. For example, the operator can know the distribution of the crop yield in the field by viewing the field polygon map.

Complementary Construction of Polygons

When the combine 10 travels for harvesting work, there are situations where the data obtainment position information temporarily cannot be obtained, due to temporary problems with the position information obtaining unit 116, for example. Accordingly, the polygon constructing unit 121 is configured to complementarily construct polygons corresponding to the timings at which the data obtainment position information was not obtained.

Cases C1 to C3 will be described next as examples of situations where polygons are constructed complementarily.

Case C1

Figure 18:
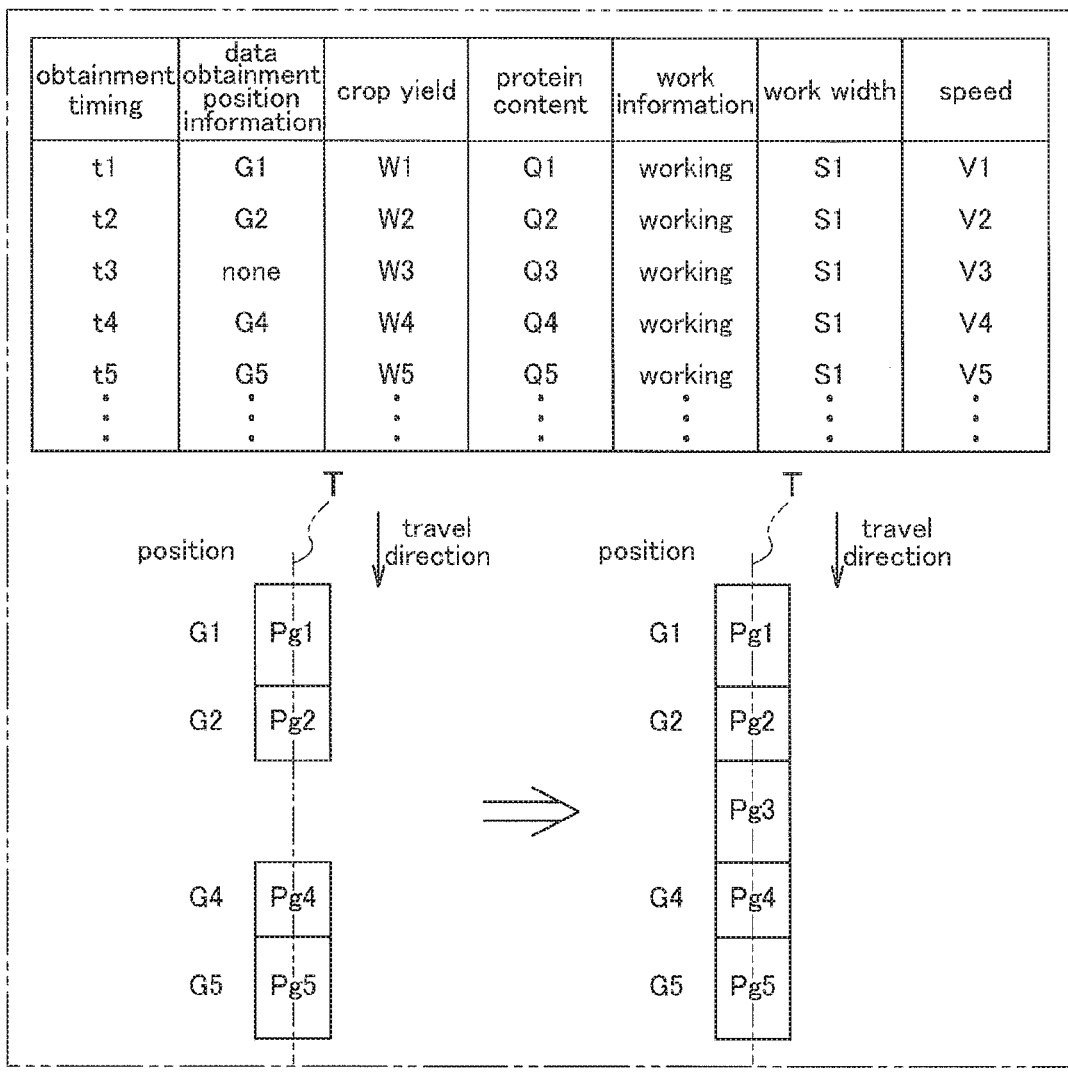
FIG. 18 is a diagram illustrating the complementary construction of polygons in a case C1.

FIG. 18 illustrates the obtainment timings, the data obtainment position information, the obtained data, the work width of the reaping unit 10*a*, and the speed of the combine 10, for case C1. As illustrated in FIG. 18, in case C1, the combine 10 travels along a travel route T, and the obtained data is obtained from obtainment timings t1 to t5.

The obtained data includes the crop yield, the crop protein content, and the working information. Although not shown in FIG. 18, the obtained data includes the fuel consumption amount and fuel economy of the combine 10.

In case C1, the data obtainment position information has been obtained at obtainment timings t1, t2, t4, and t5. As indicated on the lower-left of FIG. 18, polygons Pg1, Pg2, Pg4, and Pg5 are constructed as polygons corresponding to the obtainment timings t1, t2, t4, and t5, respectively.

For example, at the obtainment timing t1, the data obtainment position information indicating a position G1 has been obtained. The polygon Pg1 is then constructed so as to correspond to the position G1.

The obtained data corresponding to the obtainment timings t1, t2, t4, and t5 is then assigned to the polygons Pg1, Pg2, Pg4, and Pg5, respectively.

For example, a crop yield W1 and a protein content Q1 are assigned to the polygon Pg1.

However, the data obtainment position information has not been obtained at obtainment timing t3. Accordingly, as indicated in the lower-left of FIG. 18, no polygon is constructed between the polygon Pg2 and the polygon Pg4.

In such a case, the polygon constructing unit 121 complementarily constructs a polygon corresponding to the timing at which the data obtainment position information was not obtained, on the basis of the polygons corresponding to the timings before and after the timing at which the data obtainment position information was not obtained.

The data assigning unit 122 then assigns the obtained data corresponding to the timing at which the data obtainment position information was not obtained to the complementarily-constructed polygon.

In other words, in case C1, the polygon constructing unit 121 complementarily constructs the polygon Pg3, which corresponds to the obtainment timing t3, on the basis of the polygon Pg2 and the polygon Pg4, as indicated in the lower-right of FIG. 18. At this time, the polygon constructing unit 121 complementarily constructs the polygon Pg3 between the polygon Pg2 and the polygon Pg4 in the travel route T.

The data assigning unit 122 then assigns the obtained data corresponding to the obtainment timing t3 to the complementarily-constructed polygon Pg3.

In other words, a crop yield W3 and a protein content Q3 are assigned to the polygon Pg3, as illustrated in FIG. 18. The other obtained data corresponding to the obtainment timing t3 is also assigned to the polygon Pg3.

Thus if the data obtainment position information has not been obtained by the position information obtaining unit 116, the polygon constructing unit 121 complementarily constructs a polygon corresponding to the timing at which the data obtainment position information was not obtained on the basis of the polygons corresponding to the timings before and after the timing at which the data obtainment position information was not obtained, and the data assigning unit 122 assigns the obtained data corresponding to the timing at which the data obtainment position information was not obtained to the complementarily-constructed polygon.

Case C2

Figure 19:
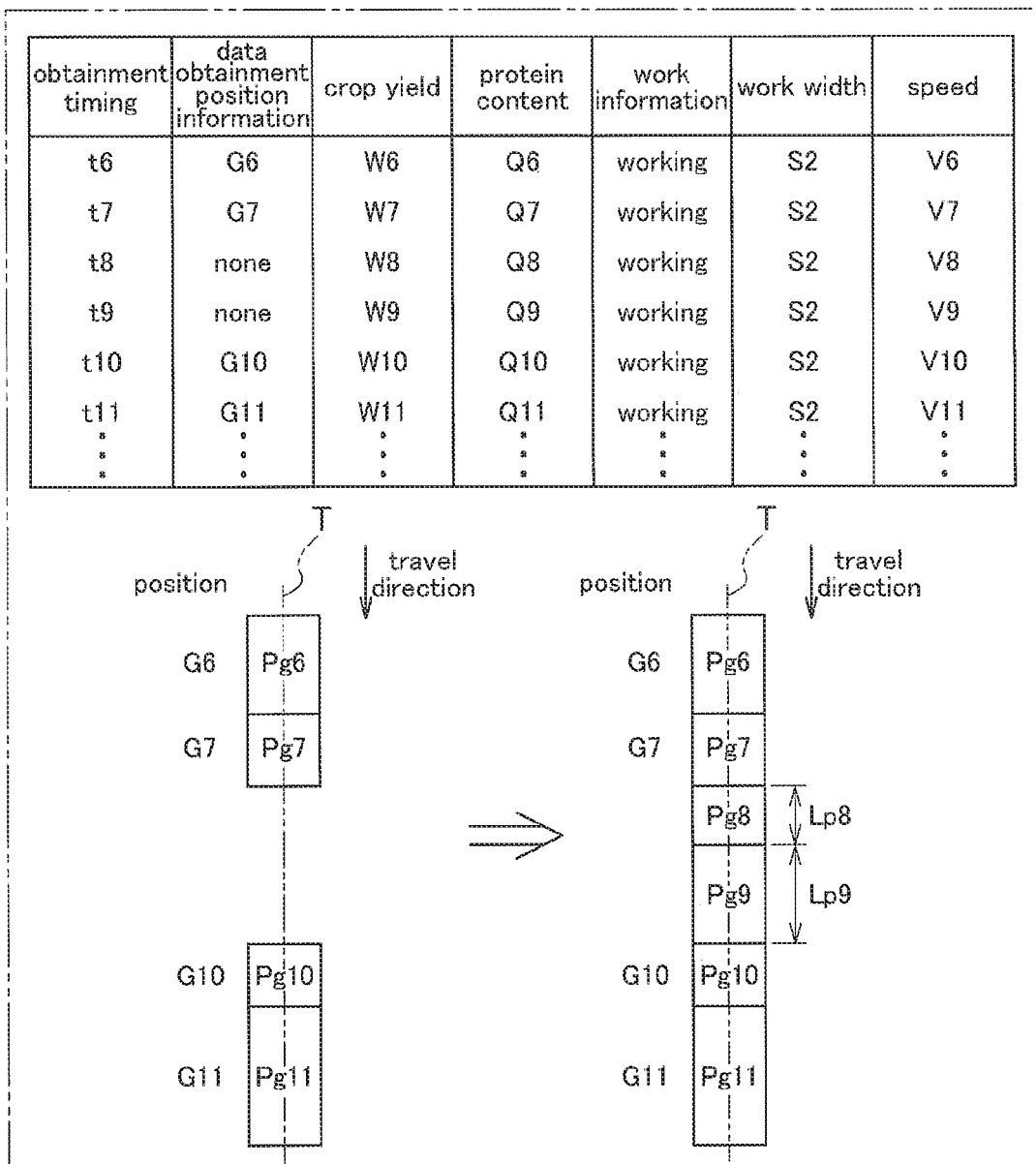
FIG. 19 is a diagram illustrating the complementary construction of polygons in a case C2.

FIG. 19 illustrates the obtainment timings, the data obtainment position information, the obtained data, the work width of the reaping unit 10*a*, and the speed of the combine 10, for case C2. As illustrated in FIG. 19, in case C2, the combine 10 travels along a travel route T, and the obtained data is obtained from obtainment timings t6 to t11.

As in case C1, the obtained data includes the crop yield, the crop protein content, and the working information. Although not shown in FIG. 19, the obtained data includes the fuel consumption amount and fuel economy of the combine 10.

In case C2, the data obtainment position information has been obtained at obtainment timings t6, t7, t10, and t11. As indicated on the lower-left of FIG. 19, polygons Pg6, Pg7, Pg10, and Pg11 are constructed as polygons corresponding to the obtainment timings t6, t7, t10, and t11, respectively.

For example, at the obtainment timing t6, the data obtainment position information indicating a position G6 has been obtained. The polygon Pg6 is then constructed so as to correspond to the position G6.

The obtained data corresponding to the obtainment timings t6, t7, t10, and t11 is then assigned to the polygons Pg6, Pg7, Pg10, and Pg11, respectively.

For example, a crop yield W6 and a protein content Q6 are assigned to the polygon Pg6.

However, the data obtainment position information has not been obtained at obtainment timings t8 and t9. Accordingly, as indicated in the lower-left of FIG. 19, no polygon is constructed between the polygon Pg7 and the polygon Pg10.

Thus if a state in which the data obtainment position information is not obtained has continued for a consecutive plurality of timings, the polygon constructing unit 121 complementarily constructs a consecutive plurality of polygons so as to correspond to each of the consecutive plurality of timings.

Additionally, at this time, the polygon constructing unit 121 determines the length of each of the complementarily-constructed polygons, with respect to the travel direction of the combine 10, on the basis of the speed detected by the vehicle speed detecting unit 118 and the obtainment time interval of the obtained data by the data obtaining unit 111.

The data assigning unit 122 then assigns the obtained data corresponding to the timing at which the data obtainment position information was not obtained to the complementarily-constructed polygon.

In other words, in case C2, the polygon constructing unit 121 complementarily constructs two consecutive polygons Pg8 and Pg9 so as to correspond to the obtainment timings t8 and t9, respectively, on the basis of the polygon Pg7 and the polygon Pg10, as indicated in the lower-right of FIG. 19. At this time, the polygon constructing unit 121 complementarily constructs the polygons Pg8 and Pg9 between the polygon Pg7 and the polygon Pg10 in the travel route T.

Additionally, at this time, the polygon constructing unit 121 calculates and determines the lengths of the complementarily-constructed polygons Pg8 and Pg9 with respect to the travel direction of the combine 10. The travel direction of the combine 10 is indicated by the arrow in FIG. 19.

A length Lp8 of the polygon Pg8 with respect to the travel direction of the combine 10 is calculated as the product of a speed V8 corresponding to the obtainment timing t8 and a time interval from the obtainment timing t7 to the obtainment timing t8.

In other words, this is calculated as:

$$Lp8 = V8 \times (t8 - t7)$$

Additionally, a length Lp9 of the polygon Pg9 with respect to the travel direction of the combine 10 is calculated as the product of a speed V9 corresponding to the obtainment timing t9 and a time interval from the obtainment timing t8 to the obtainment timing t9.

In other words, this is calculated as:

$$Lp9 = V9 \times (t9 - t8)$$

The data assigning unit 122 then assigns the obtained data corresponding to the obtainment timings t8 and t9 to the complementarily-constructed polygons Pg8 and Pg9, respectively.

In other words, a crop yield W8 and a protein content Q8 are assigned to the polygon Pg8, as illustrated in FIG. 19. The other obtained data corresponding to the obtainment timing t8 is also assigned to the polygon Pg8.

Additionally, a crop yield W9 and a protein content Q9 are assigned to the polygon Pg9. The other obtained data corresponding to the obtainment timing t9 is also assigned to the polygon Pg9.

Thus if a state in which the data obtainment position information is not obtained has continued for a consecutive plurality of timings, the polygon constructing unit 121 complementarily constructs a consecutive plurality of polygons so as to correspond to each of the consecutive plurality of timings, and also determines the lengths of the complementarily-constructed polygons with respect to the travel direction of the combine 10 on the basis of the speed detected by the vehicle speed detecting unit 118 and the obtainment time interval of the obtained data by the data obtaining unit 111.

Furthermore, when complementarily constructing a polygon, the polygon constructing unit 121 complementarily constructs a polygon corresponding to the timing at which the data obtainment position information was not obtained, as one or more polygons located between the polygon corresponding to the timing before the timing at which the data obtainment position information was not obtained, and the polygon corresponding to the timing after the timing at which the data obtainment position information was not obtained, in the travel route T of the combine 10.

Case C3

FIG. 20 illustrates the obtainment timings, the data obtainment position information, the obtained data, the work width of the reaping unit 10a, and the speed of the combine 10, for case C3.

As in case C1, the obtained data includes the crop yield, the crop protein content, and the working information. Although not shown in FIG. 20, the obtained data includes the fuel consumption amount and fuel economy of the combine 10.

In case C3, with the reaping unit 10a staying in a working state, the combine 10 travels straight through the unreaped site I12 and reaches a boundary line E between the already-reaped site H1 and the unreaped site I12, as indicated in the lower-left of FIG. 20. Upon reaching the boundary line E, the reaping unit 10a is switched from the working state to the non-working state, and the combine 10 turns while entering the already-reaped site H1 and then reaches the boundary line E again. Then, the reaping unit 10a is switched from the non-working state to the working state, and the combine 10 enters the unreaped site I12 and resumes traveling straight.

As a result, from obtainment timing t18 to t22 and from obtainment timing t26 to t30, the combine 10 is traveling straight in the unreaped site I12 and the reaping unit 10a is in a working state. However, from obtainment timing t23 to t25, the combine 10 is traveling while turning in the already-reaped site H1 and the reaping unit 10a is in a non-working state.

In other words, as illustrated in FIG. 20, in case C3, the combine 10 travels along the travel route T, and the obtained data is obtained from obtainment timings t18 to t22 and t26 to t30.

However, of the obtained data, the crop yield and the protein content are not obtained from the obtainment timing t23 to t25. This is because the reaping unit 10a is in a non-working state from the obtainment timings t23 to t25.

In case C3, the data obtainment position information is obtained at obtainment timings t18, t19, t28, t29, and t30. As indicated on the lower-left of FIG. 20, polygons Pg18, Pg19, Pg28, Pg29, and Pg30 are constructed as polygons corresponding to the obtainment timings t18, t19, t28, t29, and t30, respectively.

For example, at the obtainment timing t18, the data obtainment position information has been obtained at a position G18. The polygon Pg18 is then constructed so as to correspond to the position G18.

The obtained data corresponding to the obtainment timings t18, t19, t28, t29, and t30 is then assigned to the polygons Pg18, Pg19, Pg28, Pg29, and Pg30, respectively.

For example, a crop yield W18 and a protein content Q18 are assigned to the polygon Pg18.

However, the data obtainment position information has not been obtained from obtainment timing t20 to t27. Accordingly, as indicated in the lower-left of FIG. 20, no polygon is constructed between the polygon Pg19 and the polygon Pg28 in the travel route T.

Thus if a state in which the data obtainment position information is not obtained has continued for a consecutive plurality of timings and the consecutive plurality of timings includes a timing at which the reaping unit 10a is in a non-working state, the polygon constructing unit 121 complementarily constructs a plurality of polygons so as to correspond to the timings, among the consecutive plurality of timings, in which the reaping unit 10a is in a working state.

At this time, for the timings before the timings at which the reaping unit 10a is in a non-working state, the polygon constructing unit 121 complementarily constructs one or more polygons upon a line extending toward the forward side of the polygon located to the rear in the travel direction of the combine 10.

Additionally, for the timings after the timings at which the reaping unit 10a is in a non-working state, the polygon constructing unit 121 complementarily constructs one or more polygons upon a line extending toward the rearward side of the polygon located to the front in the travel direction of the combine 10.

The data assigning unit 122 then assigns the obtained data corresponding to the timing, among the timings in which the data obtainment position information was not obtained, at which the reaping unit 10a was in a working state, to the complementarily-constructed polygon.

In other words, in case C3, the polygon constructing unit 121 complementarily constructs polygons Pg20, Pg21, Pg22, Pg26, and Pg27 so as to correspond to the obtainment timings t20, t21, t22, t26, and t27, respectively, on the basis of the polygon Pg19 and the polygon Pg28, as indicated in the lower-right of FIG. 20.

The obtainment timings t23 to t25 are the timings at which the reaping unit 10a is in a non-working state. Of the polygons Pg19 and Pg28, which correspond to the timings before and after the timing at which the data obtainment position information was not obtained, the polygon Pg19 is located on the rearward side in the travel direction of the combine 10, and the polygon Pg28 is located on the forward side in the travel direction of the combine 10.

As such, for the timings before the obtainment timing t23, the polygon constructing unit 121 complementarily constructs polygons on a line extending toward the forward side of the polygon Pg19. As a result, the polygons Pg20, Pg21, and Pg22 are complementarily constructed, as indicated in the lower-right of FIG. 20.

Additionally, for the timings after the obtainment timing t25, the polygon constructing unit 121 complementarily constructs polygons on a line extending toward the rearward side of the polygon Pg28. As a result, the polygons Pg26 and Pg27 are complementarily constructed, as indicated in the lower-right of FIG. 20.

The data assigning unit 122 assigns the obtained data corresponding to the obtainment timings t20, t21, t22, t26, and t27 to the complementarily-constructed polygons Pg20, Pg21, Pg22, Pg26, and Pg27, respectively.

In other words, a crop yield W20 and a protein content Q20 are assigned to the polygon Pg20, as illustrated in FIG. 20. The other obtained data corresponding to the obtainment timing t20 is also assigned to the polygon Pg20.

Likewise, crop yields W21, W22, W26, and W27 and protein contents Q21, Q22, Q26, and Q27 are assigned to the polygons Pg21, Pg22, Pg26, and Pg27, respectively. The other obtained data corresponding to the obtainment timings t21, t22, t26, and t27 is allocated to the polygons Pg21, Pg22, Pg26, and Pg27, respectively.

Note that in case C3, polygons corresponding to the obtainment timings t23 to t25 are not complementarily constructed. This is because the reaping unit 10a is in a non-working state, and the crop yield and protein content have therefore not been obtained.

However, the present invention is not limited thereto, and the polygon constructing unit 121 may be configured to complementarily construct polygons corresponding to the timings at which the reaping unit 10a is in a non-working state. In this case, the data assigning unit 122 may be configured to assign obtained data corresponding to the timings at which the reaping unit 10a is in a non-working state to the complementarily-constructed polygons.

In case C3, the obtainment timings t23 to t25 are the timings at which the reaping unit 10a is in a non-working state. As such, for the timings before the obtainment timing t23, the polygon constructing unit 121 complementarily constructs a plurality of polygons on a line extending toward the forward side of the polygon Pg19. Additionally, for the timings after the obtainment timing t25, the polygon constructing unit 121 complementarily constructs a plurality of polygons on a line extending toward the rearward side of the polygon Pg28.

Here, if the reaping unit 10a was in a non-working state from obtainment timings t21 to t26, the polygon constructing unit 121 complementarily constructs a single polygon on a line extending toward the forward side of the polygon Pg19 for the obtainment timing t20, and complementarily constructs a single polygon on a line extending toward the rearward side of the polygon Pg28 for the obtainment timing t27.

Thus if a state in which the data obtainment position information is not obtained has continued for a consecutive plurality of timings, and a timing at which the reaping unit 10a is in a non-working state is included in the consecutive plurality of timings, the polygon constructing unit 121 complementarily constructs one or more polygons on a line extending toward the forward side of the polygon located to the rear in the travel direction of the combine 10 for timings before the timing at which the reaping unit 10a is in a non-working state, and complementarily constructs one or more polygons on a line extending toward the rearward side of the polygon located to the front in the travel direction of the combine 10 for timings after the timing at which the reaping unit 10a is in a non-working state.

According to the configuration described thus far, the polygon constructing unit 121 constructs a polygon, and assigns the obtained data to the constructed polygon, on the basis of the data obtainment position information, the work width of the reaping unit 10a, and the obtainment timing of the obtained data from the data obtaining unit 111.

If the data obtainment position information has not been obtained, the polygon constructing unit 121 complementarily constructs a polygon corresponding to the timing at which the data obtainment position information was not obtained, on the basis of the polygons corresponding to the timings before and after the timing at which the data obtainment position information was not obtained. The obtained data corresponding to the timing at which the data obtainment position information was not obtained is then assigned to the complementarily-constructed polygon.

In other words, according to the configuration described thus far, the obtained data is associated with a polygon even if there is no corresponding data obtainment position information. Accordingly, obtained data for which there is no corresponding data obtainment position information is reflected in the generated field map.

Thus according to the configuration described thus far, an accurate field map can be generated even when the position information of the combine 10 has temporarily not been obtained.

First Variation on Second Embodiment

As illustrated in FIG. 19, in the foregoing embodiment, if a state in which the data obtainment position information is not obtained has continued for a consecutive plurality of timings, the polygon constructing unit 121 complementarily constructs a consecutive plurality of polygons so as to correspond to each of the consecutive plurality of timings.

However, the present invention is not limited thereto. A first variation on the second embodiment will be described next, focusing on the differences from the foregoing embodiment. Aside from the parts described below, the configuration is the same as in the foregoing embodiment. Configurations that are the same as in the foregoing embodiment are given the same reference signs.

In the first variation on the second embodiment, if a state in which the data obtainment position information is not obtained has continued for a consecutive plurality of timings, the polygon constructing unit 121 complementarily constructs a single polygon that corresponds to the consecutive plurality of timings.

The data assigning unit 122 then takes a value obtained by averaging or adding the plurality of pieces of obtained data, which correspond to the consecutive plurality of timings, according to attributes of the obtained data, and assigns that value to the single complementarily-constructed polygon.

Case C4 will be described next as an example of situations where a polygon is constructed complementarily, according to the first variation of the present invention.

Case C4

FIG. 21 illustrates the obtainment timings, the data obtainment position information, the obtained data, the work width of the reaping unit 10a, and the speed of the combine 10, for case C4. As illustrated in FIG. 21, in case C4, the combine 10 travels along a travel route T, and the obtained data is obtained from obtainment timings t32 to t37.

The obtained data includes the crop yield, the crop protein content, and the working information. Although not shown in FIG. 21, the obtained data includes the fuel consumption amount and fuel economy of the combine 10.

In case C4, the data obtainment position information is obtained at obtainment timings t32, t33, t36, and t37. As indicated on the lower-left of FIG. 21, polygons Pg32, Pg33, Pg36, and Pg37 are constructed as polygons corresponding to the obtainment timings t32, t33, t36, and t37, respectively.

For example, at the obtainment timing t32, the data obtainment position information has been obtained at a position G32. The polygon Pg32 is then constructed so as to correspond to the position G32.

The obtained data corresponding to the obtainment timings t32, t33, t36, and t37 is then assigned to the polygons Pg32, Pg33, Pg36, and Pg37, respectively.

For example, a crop yield W32 and a protein content Q32 are assigned to the polygon Pg32.

However, the data obtainment position information has not been obtained at obtainment timings t34 and t35. Accordingly, as indicated in the lower-left of FIG. 21, no polygon is constructed between the polygon Pg33 and the polygon Pg36.

In case C4, the polygon constructing unit 121 complementarily constructs a single polygon Pg34, which corresponds to the obtainment timings t34 and t35, on the basis of the polygon Pg33 and the polygon Pg36, as indicated in the lower-right of FIG. 21. At this time, the polygon constructing unit 121 complementarily constructs the polygon Pg34 between the polygon Pg33 and the polygon Pg36 in the travel route T.

The data assigning unit 122 then averages or adds the obtained data corresponding to the obtainment timings t34 and t35 in accordance with attributes of the obtained data. The value obtained from this averaging or adding is then assigned to the complementarily-constructed polygon Pg34.

For example, the data assigning unit 122 takes a value obtained by adding the crop yields W34 and W35 corresponding to the obtainment timings t34 and t35, respectively, and assigns that value to the complementarily-constructed polygon Pg34. Additionally, the data assigning unit 122 takes a value obtained by averaging the crop protein contents Q34 and Q35 corresponding to the obtainment timings t34 and t35, respectively, and assigns that value to the complementarily-constructed polygon Pg34.

The other obtained data corresponding to the obtainment timings t34 and t35 is also averaged or added in accordance with attributes of the obtained data, and then assigned to the polygon Pg34.

Thus if a state in which the data obtainment position information is not obtained has continued for a consecutive plurality of timings, the polygon constructing unit 121 complementarily constructs a single polygon corresponding to the consecutive plurality of timings, after which the data assigning unit 122 takes a value obtained by averaging or adding the plurality of pieces of obtained data, which correspond to the consecutive plurality of timings, according to attributes of the obtained data, and assigns that value to the single complementarily-constructed polygon.

Variations on Second Embodiment (1) As in the first embodiment, a map converting unit, which converts the field polygon map generated by the field map generating unit 123 into a post-conversion map segmented into a plurality of index segments different from the polygons, may be provided. In this case, if, as in the foregoing embodiment, a polygon has been complementarily constructed so as to correspond to the timing at which the data obtainment position information has not been obtained, assigning the obtained data to the index segments as appropriate makes it possible to generate an accurate post-conversion map. However, if a polygon has not been complementarily constructed so as to correspond to the timing at which the data obtainment position information has not been obtained, the generated field polygon map will contain a region where no polygon is present. The accuracy of the obtained data assigned to the index segments including the region where no polygon is present will drop as a result. In this case, the operator can grasp the reliability of each index segment by providing different display states for index segments including regions where no polygons are present and index segments not including regions where no polygons are present.

(2) The obtained data which is obtained by the data obtaining unit 111 may include the moisture value of the crop, and may include the flavor of the crop.

(3) The obtained data which is obtained by the data obtaining unit 111 need not include the working information.

(4) The configuration may be such that the vehicle speed detecting unit 118 is omitted. In this configuration, the configuration may be such that if a state in which the data obtainment position information is not obtained has continued for a consecutive plurality of timings, the polygon constructing unit 121 complementarily constructs a consecutive plurality of polygons so as to correspond to each of the consecutive plurality of timings, and also determines the lengths of the complementarily-constructed polygons with respect to the travel direction of the combine 10 on the basis of a predetermined speed and the obtainment time interval of the obtained data by the data obtaining unit 111.

(5) The configuration may be such that the work width detecting unit 117 is omitted. In this case, the configuration can be such that the left-right width of the reaping unit 10*a* is treated as the work width.

(6) The crop yield measuring unit 112 may be omitted.

(7) The protein measuring unit 113 may be omitted.

(8) The working state detecting unit 114 may be omitted.

(9) The fuel measuring unit 115 may be omitted.

(10) Some or all of the polygon constructing unit 121, the data assigning unit 122, the field map generating unit 123, and the field map storing unit 124 may be provided in the combine 10.

(11) The field map generating system A may be configured to generate the field polygon map on the basis of obtained data obtained by the tractor 4. In this case, the polygon constructing unit 121 can be configured to construct the polygons on the basis of the data obtainment position information, the work width of the tilling unit 4*a*, and the obtainment timing of the obtained data from the data obtaining unit 111.

(12) The field map generating system A may be configured to generate the field polygon map on the basis of obtained data obtained by the rice transplanter 5. In this case, the polygon constructing unit 121 can be configured to construct the polygons on the basis of the data obtainment position information, the work width of the planting unit 5*a*, and the obtainment timing of the obtained data from the data obtaining unit 111.

(13) The polygons can be constructed using any desired configuration or method, regardless of the polygon constructing unit 121. Additionally, the field map can be generated using any desired configuration or method, regardless of the data assigning unit 122 and the field map generating unit 123. As in the first embodiment, the polygon map conversion can be realized by providing the map converting unit 32 in the management server 2, and can be carried out using any desired configuration or method. Furthermore, these methods can be realized by programs. In this case, the programs are stored in the storage device 34, and the programs are executed by the CPU 35, as illustrated in FIG. 15. Note that the storage device 34 and the CPU 35 can be provided in any desired location, e.g., the management server 2 or the operating terminal 3.

INDUSTRIAL APPLICABILITY

The present invention can be applied in a field map generating system that generates a map on the basis of data pertaining to a crop harvested by a harvester.

DESCRIPTION OF REFERENCE SIGNS

1 Work Vehicle
4*a* Tilling Unit (Work Device)
5*a* Planting Unit (Work Device)
10 Combine (Harvester)
10*a* Reaping Unit (Work Device)
11 Working State Determining Unit
12 Work Width Calculating Unit
14 Crop Data Obtaining Unit
17 Position Information Obtaining Unit
21 Crop Yield Polygon Constructing Unit (Polygon Constructing Unit)
22 Crop Yield Data Assigning Unit (Data Assigning Unit)
23 Crop Yield Polygon Map Generating Unit (Field Map Generating Unit)
24 Per-Surface Area Unit Crop Yield Polygon Constructing Unit (Polygon Constructing Unit)
25 Per-Surface Area Unit Crop Yield Data Assigning Unit (Data Assigning Unit)
26 Per-Surface Area Unit Crop Yield Polygon Map Generating Unit (Field Map Generating Unit)
28 Protein Polygon Constructing Unit (Polygon Constructing Unit)
29 Protein Data Assigning Unit (Data Assigning Unit)
30 Protein Polygon Map Generating Unit (Field Map Generating Unit)
31 Position Information Assigning Unit
32 Map Converting Unit
111 Data Obtaining Unit
116 Position Information Obtaining Unit
118 Vehicle Speed Detecting Unit
121 Polygon Constructing Unit
122 Data Assigning Unit
A Field Map Generating System
T Travel Route

The invention claimed is:

1. A field map generating system comprising:
a crop data obtaining unit that obtains crop data, the crop data being data pertaining to a crop harvested by a harvester, over time;
a position information obtaining unit that obtains position information, the position information indicating the position where the crop is harvested in a field, over time;
a polygon constructing unit that constructs, for each piece of the crop data obtained by the crop data obtaining unit, a polygon based on a work width and a speed of the harvester, thereby producing a plurality of polygons;
a data assigning unit that assigns the crop data or crop information based on the crop data to each polygon constructed by the polygon constructing unit;
a position information assigning unit that assigns the position information to each polygon constructed by the polygon constructing unit; and
a field map generating unit that generates a field polygon map, the field polygon map being an aggregate of the plurality of polygons, by aggregating the plurality of polygons.

2. The field map generating system according to claim 1, further comprising:
a working state determining unit that determines whether or not each of a plurality of regions of a work device included in the harvester, the regions arranged in a left-right direction, are in a working state; and
a work width calculating unit that calculates a work width of the harvester based on a result of the determination by the working state determining unit.

3. The field map generating system according to claim 1, wherein the crop data obtaining unit obtains a plurality of types of crop data over time; and
the field map generating unit generates the field polygon map for each type of the crop data.

4. The field map generating system according to claim 1, wherein the crop data obtaining unit obtains a crop yield over time as the crop data; and
the data assigning unit assigns the crop yield to the plurality of polygons as the crop data.

5. The field map generating system according to claim 4, further comprising:
a map converting unit that converts the field polygon map into a post-conversion map segmented into a plurality of index segments different from the plurality of polygons,
wherein the map converting unit calculates the crop yield to be assigned to each index segment by adding together surface area-appropriated crop yields of the parts of each polygon included in the index segments.

6. The field map generating system according to claim 5, wherein the map converting unit determines the size of the index segments in accordance with the work width of a different work vehicle from the harvester.

7. The field map generating system according to claim 1, wherein the crop data obtaining unit obtains a crop yield over time as the crop data; and
the data assigning unit assigns a per-surface area unit crop yield, calculated by dividing the crop yield obtained by the crop data obtaining unit by a field surface area corresponding to the polygon to which the per-surface area unit crop yield is to be assigned, to the plurality of polygons, as the crop information.

8. The field map generating system according to claim 7, further comprising:
a map converting unit that converts the field polygon map into a post-conversion map segmented into a plurality of index segments different from the plurality of polygons,
wherein the map converting unit calculates a per-surface area unit crop yield to be assigned to each index segment by taking the sum of surface area-appropriated crop yields of the parts of each polygon included in the index segments and dividing that sum by a field surface area corresponding to the index segment to which the per-surface area unit crop yield is to be assigned.

9. The field map generating system according to claim 1, wherein the crop data obtaining unit obtains a quality value, the quality value being a value indicating the quality of the crop, over time as the crop data; and
the data assigning unit assigns the quality value to the plurality of polygons as the crop data.

10. The field map generating system according to claim 9, further comprising:
a map converting unit that converts the field polygon map into a post-conversion map segmented into a plurality of index segments different from the plurality of polygons,
wherein the map converting unit calculates the quality value to be assigned to each index segment as a mean value of the quality values assigned to polygons, among the plurality of polygons, included in the index segments; and
when calculating the mean value, the map converting unit carries out weighting using a field surface area corresponding to the part of each polygon present in each index segment.

11. A method of generating a field map pertaining to a crop in a field that is harvested by a traveling harvester, the method comprising:
a step of obtaining position information of the traveling harvester over time;
a step of obtaining crop data of the crop over time;
a step of creating a polygon based on a travel state of the harvester at a time when each piece of the crop data is obtained, thereby producing a plurality of polygons;
a step of assigning the obtained crop data to the corresponding polygon;
a step of generating a field map for an entire field by aggregating the plurality of polygons;
a step of estimating a plurality of index segments that divide the field; and
a step of converting the field map into a post-conversion map in which the crop data is assigned to the index segments.

12. The field map generating method according to claim 11,
wherein the crop data is a crop yield of a harvested crop; and
the crop yield to be assigned to each index segment is calculated by adding together surface area-appropriated crop yields of the parts of each polygon included in the index segments.

13. The field map generating method according to claim 11,
wherein the crop data is a per-surface area unit crop yield of a harvested crop; and
the per-surface area unit crop yield to be assigned to each index segment is calculated by taking the sum of surface area-appropriated crop yields of the parts of each polygon included in the index segments and dividing that sum by a field surface area corresponding to the index segment to which the per-surface area unit crop yield is to be assigned.

14. The field map generating method according to claim 11, wherein the polygon is created based on a work width of the harvester and a speed of the harvester, the work width and the speed serving as the travel state.

15. The field map generating method according to claim 11,
wherein the crop data is a quality value of a harvested crop;
the quality value to be assigned to each index segment is calculated as a mean value of the quality values assigned to polygons of the plurality of polygons included in the index segments; and
when calculating the mean value, weighting is carried out using a field surface area corresponding to the part of each polygon present in each index segment.

16. A field map generating system comprising:
a data obtaining unit that, in a work vehicle that uses a work device to carry out agricultural work while traveling in a field, obtains, as obtained data, at least one of operation information, which is information pertaining to the operation of a machine, field information, which is information pertaining to the field, and crop information, which is information pertaining to a crop;
a position information obtaining unit capable of obtaining data obtainment position information, which is position information of the work vehicle at a time when the obtained data is obtained by the data obtaining unit;
a polygon constructing unit that constructs a polygon based on the data obtainment position information, a work width of the work device, and an obtainment timing of the obtained data by the data obtaining unit, thereby producing a plurality of polygons;
a data assigning unit that assigns the obtained data to each polygon constructed by the polygon constructing unit; and
a field map generating unit that generates a field polygon map, the field polygon map being an aggregate of the plurality of polygons, by aggregating the plurality of polygons, wherein if the data obtainment position information has not been obtained by the position information obtaining unit, the polygon constructing unit complementarily constructs a polygon corresponding to the timing at which the data obtainment position information was not obtained based on polygons corresponding to the timings before and after the timing at which the data obtainment position information was not obtained, and the data assigning unit assigns the obtained data corresponding to the timing at which the data obtainment position information was not obtained to the complementarily-constructed polygon.

17. The field map generating system according to claim 16,
wherein when complementarily constructing a polygon, the polygon constructing unit complementarily constructs a polygon corresponding to the timing at which the data obtainment position information was not obtained, as one or more polygons located between the polygon corresponding to the timing before the timing at which the data obtainment position information was not obtained, and the polygon corresponding to the timing after the timing at which the data obtainment position information was not obtained, in a travel route of the work vehicle.

18. The field map generating system according to claim 16, further comprising:
a vehicle speed detecting unit that detects a speed of the work vehicle,
wherein if a state in which the data obtainment position information is not obtained has continued for a consecutive plurality of timings, the polygon constructing unit complementarily constructs a consecutive plurality of polygons so as to correspond to each of the consecutive plurality of timings, and also determines lengths of the complementarily-constructed polygons with respect to a travel direction of the work vehicle based on the speed detected by the vehicle speed detecting unit and an obtainment time interval of the obtained data by the data obtaining unit.

19. The field map generating system according to claim 16,
wherein if a state in which the data obtainment position information is not obtained has continued for a consecutive plurality of timings, the polygon constructing unit complementarily constructs a single polygon corresponding to the consecutive plurality of timings, and the data assigning unit takes a value obtained by averaging or adding the plurality of pieces of obtained data corresponding to the consecutive plurality of timings according to attributes of the obtained data and assigns that value to the single complementarily-constructed polygon.

20. The field map generating system according to claim 16,
wherein the obtained data obtained by the data obtaining unit includes working information, indicating whether the work device is in a working state or a non-working state, as the operation information; and
if a state in which the data obtainment position information is not obtained has continued for a consecutive plurality of timings, and a timing at which the work device is in a non-working state is included in the consecutive plurality of timings, the polygon constructing unit complementarily constructs one or more polygons on a line extending toward a forward side of the polygon located to the rear in the travel direction of the work vehicle for a timing before the timing at which the work device is in a non-working state, and complementarily constructs one or more polygons on a line extending toward a rearward side of the polygon located to the front in the travel direction of the work vehicle for a timing after the timing at which the work device is in a non-working state.

21. The field map generating system according to claim 16,
wherein the data obtaining unit obtains a crop yield over time as the obtained data;
the data assigning unit assigns the crop yield to the plurality of polygons as the obtained data;
the system further comprises a map converting unit that converts the field polygon map into a post-conversion map segmented into a plurality of index segments different from the plurality of polygons; and
the map converting unit calculates the crop yield to be assigned to each index segment by adding together surface area-appropriated crop yields of the parts of each polygon included in the index segments.

22. The field map generating system according to claim 16,
wherein the data obtaining unit obtains a crop yield over time as the obtained data;
the data assigning unit assigns a per-surface area unit crop yield, calculated by dividing the crop yield obtained by the data obtaining unit by a field surface area corresponding to the polygon to which the per-surface area unit crop yield is to be assigned, to the plurality of polygons, as the crop information;
the system further comprises a map converting unit that converts the field polygon map into a post-conversion map segmented into a plurality of index segments different from the plurality of polygons; and
the map converting unit calculates a per-surface area unit crop yield to be assigned to each index segment by taking the sum of surface area-appropriated crop yields of the parts of each polygon included in the index segments and dividing that sum by a field surface area corresponding to the index segment to which the per-surface area unit crop yield is to be assigned.

23. The field map generating system according to claim 16,
wherein the data obtaining unit obtains a quality value, the quality value being a value indicating the quality of the crop, over time as the obtained data;
the data assigning unit assigns the quality value to the plurality of polygons as the obtained data;
the system further comprises a map converting unit that converts the field polygon map into a post-conversion map segmented into a plurality of index segments different from the plurality of polygons;
the map converting unit calculates the quality value to be assigned to each index segment as a mean value of the quality values assigned to polygons, among the plurality of polygons, included in the index segments; and
when calculating the mean value, the map converting unit carries out weighting using a field surface area corresponding to the part of each polygon present in each index segment.

24. A method of generating a field map pertaining to a crop in a field that is harvested by a traveling harvester, the method comprising:

a step of obtaining crop data of the crop over time;

a step of obtaining data obtainment position information of the harvester during travel when obtaining the crop data of the crop;

a step of creating a polygon based on the data obtainment position information of the harvester at a time when the crop data is obtained, thereby producing a plurality of polygons;

a step of assigning the obtained crop data to the corresponding polygon;

if a polygon has not been created due to the data obtainment position information of the harvester not being obtained when the crop data is obtained, a step of complementarily creating the polygon that was not created;

a step of assigning corresponding crop data to the complementarily-created polygon; and a step of generating a field map for the entire field by aggregating the plurality of polygons;

wherein a polygon corresponding to the timing at which the data obtainment position information was not obtained is complementarily created based on polygons of the plurality of polygons corresponding to the timings before and after the timing at which the data obtainment position information was not obtained.

* * * * *